(12) United States Patent
Mukaddam et al.

(10) Patent No.: US 8,016,260 B2
(45) Date of Patent: Sep. 13, 2011

(54) METERING ASSEMBLY AND METHOD OF DISPENSING FLUID

(75) Inventors: Kabir James Mukaddam, Jamaica Plain, MA (US); Jennifer Ezu Hu, Falcon Hts., MN (US); Jeremy Stevenson, Lexington, MA (US)

(73) Assignee: Formulatrix, Inc., Waltham, MA (US)

( * ) Notice: Subject to any disclaimer, the term of this patent is extended or adjusted under 35 U.S.C. 154(b) by 824 days.

(21) Appl. No.: 11/952,683

(22) Filed: Dec. 7, 2007

(65) Prior Publication Data

US 2009/0020556 A1 Jan. 22, 2009

Related U.S. Application Data

(63) Continuation-in-part of application No. 11/880,112, filed on Jul. 19, 2007, now abandoned.

(51) Int. Cl.
*F16K 31/00* (2006.01)
(52) U.S. Cl. .................. 251/61.2; 251/61.1; 251/331
(58) Field of Classification Search .............. 251/61, 251/61.1, 61.2, 331
See application file for complete search history.

(56) References Cited

U.S. PATENT DOCUMENTS

| | | | | |
|---|---|---|---|---|
| 4,848,722 A | * | 7/1989 | Webster | 251/61.1 |
| 4,852,851 A | * | 8/1989 | Webster | 251/61.1 |
| 4,858,883 A | * | 8/1989 | Webster | 251/61.1 |
| 4,869,282 A | * | 9/1989 | Sittler et al. | 137/15.01 |
| 5,177,579 A | * | 1/1993 | Jerman | 73/724 |
| 5,271,724 A | * | 12/1993 | van Lintel | 417/413.2 |
| 5,660,370 A | * | 8/1997 | Webster | 251/129.17 |
| 5,785,295 A | * | 7/1998 | Tsai | 251/11 |
| 5,800,690 A | | 9/1998 | Chow et al. | |
| 5,834,314 A | | 11/1998 | Gates et al. | |
| 5,842,787 A | | 12/1998 | Kopf-Sill et al. | |
| 5,869,004 A | | 2/1999 | Parce et al. | |
| 5,876,675 A | | 3/1999 | Kennedy | |
| 5,959,291 A | | 9/1999 | Jensen | |

(Continued)

FOREIGN PATENT DOCUMENTS

AU 199868841 B2 10/1998

(Continued)

OTHER PUBLICATIONS

European Search Report from European Application No. 10150624, dated Mar. 18, 2010.

(Continued)

*Primary Examiner* — John Fristoe, Jr.
(74) *Attorney, Agent, or Firm* — Wolf, Greenfield & Sacks, P.C.

(57) ABSTRACT

A metering assembly includes a fluidic chip and metering chambers. Selectable outlet valves communicate with each metering chamber to provide a discrete dispensed volume. The valves may be commonly controlled and may be formed as multi-level valves. The valves may be grouped into common substrate valve clusters. Purge channels communicate with the metering chambers and controlled purge valves allow reverse flow wash fluid to wash the metering chamber. Pressure ports are employed to actuate the valves. A method of dispensing a fluid from the fluidic chip includes a) selectively filling (or filling) the metering chambers with a selected fluid; and b) outputting (or selectively outputting) the fluid to output locations. The total output volume of fluid dispensed from each metering chamber may be accumulated. The process may be repeated until the accumulated volume equals the desired volume and may be repeated for another fluid from a plurality of different fluids.

23 Claims, 25 Drawing Sheets

U.S. PATENT DOCUMENTS

| | | | |
|---|---|---|---|
| 5,964,995 A | 10/1999 | Nikiforov et al. | |
| 5,976,336 A | 11/1999 | Dubrow et al. | |
| 5,989,402 A | 11/1999 | Chow et al. | |
| 6,012,902 A | 1/2000 | Parce | |
| 6,074,725 A | 6/2000 | Kennedy | |
| 6,086,740 A | 7/2000 | Kennedy | |
| 6,117,396 A | 9/2000 | Demers | |
| 6,148,508 A | 11/2000 | Wolk | |
| 6,149,787 A | 11/2000 | Chow et al. | |
| 6,150,119 A | 11/2000 | Kopf-Sill et al. | |
| 6,227,824 B1 | 5/2001 | Stehr | |
| 6,235,471 B1 | 5/2001 | Knapp et al. | |
| 6,274,089 B1 | 8/2001 | Chow et al. | |
| 6,283,730 B1 | 9/2001 | Sasaki et al. | |
| 6,293,012 B1 * | 9/2001 | Moles | 29/890.124 |
| 6,322,683 B1 | 11/2001 | Wolk et al. | |
| 6,357,141 B1 | 3/2002 | Kearsley et al. | |
| 6,391,622 B1 | 5/2002 | Knapp et al. | |
| 6,403,338 B1 | 6/2002 | Knapp et al. | |
| 6,406,893 B1 | 6/2002 | Knapp et al. | |
| 6,440,722 B1 | 8/2002 | Knapp et al. | |
| 6,444,461 B1 | 9/2002 | Knapp et al. | |
| 6,458,259 B1 | 10/2002 | Parce et al. | |
| 6,468,763 B1 | 10/2002 | Farinas | |
| 6,481,453 B1 | 11/2002 | O'Connor et al. | |
| 6,500,323 B1 | 12/2002 | Chow et al. | |
| 6,506,609 B1 | 1/2003 | Wada et al. | |
| 6,521,188 B1 | 2/2003 | Webster | |
| 6,529,835 B1 | 3/2003 | Wada et al. | |
| 6,613,580 B1 | 9/2003 | Chow et al. | |
| 6,615,856 B2 | 9/2003 | McNeely et al. | |
| 6,619,311 B2 | 9/2003 | O'Connor et al. | |
| 6,635,487 B1 | 10/2003 | Lee et al. | |
| 6,674,525 B2 | 1/2004 | Bardell et al. | |
| D486,156 S | 2/2004 | Lee et al. | |
| D488,818 S | 4/2004 | Lee et al. | |
| 6,720,148 B1 | 4/2004 | Nikiforov | |
| 6,733,645 B1 | 5/2004 | Chow | |
| 6,748,978 B2 | 6/2004 | Pezzuto et al. | |
| 6,801,875 B1 | 10/2004 | Wolk et al. | |
| 6,827,095 B2 | 12/2004 | O'Connor et al. | |
| 6,827,113 B2 | 12/2004 | Downs et al. | |
| 6,849,411 B2 | 2/2005 | Knapp et al. | |
| 6,858,185 B1 | 2/2005 | Kopf-Sill et al. | |
| 6,951,632 B2 | 10/2005 | Unger et al. | |
| 6,959,725 B2 * | 11/2005 | Yoshino et al. | 137/505.25 |
| 6,977,163 B1 | 12/2005 | Mehta | |
| 7,001,853 B1 | 2/2006 | Brown et al. | |
| 7,024,281 B1 | 4/2006 | Unno | |
| 7,036,917 B2 | 5/2006 | Muller-Chorus et al. | |
| 7,038,472 B1 | 5/2006 | Chien | |
| 7,052,594 B2 | 5/2006 | Pelrine et al. | |
| 7,060,171 B1 | 6/2006 | Nikiforov et al. | |
| 7,069,952 B1 | 7/2006 | McReynolds et al. | |
| 7,077,152 B2 | 7/2006 | Karp | |
| 7,150,999 B1 | 12/2006 | Shuck | |
| 7,153,421 B2 | 12/2006 | Koehler et al. | |
| 7,161,356 B1 | 1/2007 | Chien | |
| 7,178,386 B1 | 2/2007 | Gamble et al. | |
| 7,208,125 B1 | 4/2007 | Dong | |
| 7,284,966 B2 | 10/2007 | Xu et al. | |
| 7,540,469 B1 * | 6/2009 | Okandan | 251/129.01 |
| 2001/0020589 A1 | 9/2001 | Kopf-Sill | |
| 2001/0026929 A1 | 10/2001 | Yang et al. | |
| 2001/0027918 A1 | 10/2001 | Parce et al. | |
| 2001/0033796 A1 | 10/2001 | Unger et al. | |
| 2001/0036626 A1 | 11/2001 | Farinas et al. | |
| 2001/0045358 A1 | 11/2001 | Kopf-Sill et al. | |
| 2001/0049148 A1 | 12/2001 | Wolk et al. | |
| 2001/0051338 A1 | 12/2001 | Chan et al. | |
| 2001/0052460 A1 | 12/2001 | Chien et al. | |
| 2002/0001856 A1 | 1/2002 | Chow et al. | |
| 2002/0003177 A1 | 1/2002 | O'Connor et al. | |
| 2002/0004182 A1 | 1/2002 | McReynolds | |
| 2002/0009392 A1 | 1/2002 | Wolk et al. | |
| 2002/0009711 A1 | 1/2002 | Wada et al. | |
| 2002/0012971 A1 | 1/2002 | Mehta | |
| 2002/0017464 A1 | 2/2002 | Parce et al. | |
| 2002/0019059 A1 | 2/2002 | Chow et al. | |
| 2002/0023684 A1 | 2/2002 | Chow | |
| 2002/0025280 A1 | 2/2002 | Chazan et al. | |
| 2002/0033337 A1 | 3/2002 | Ausserer et al. | |
| 2002/0034580 A1 | 3/2002 | Yang et al. | |
| 2002/0037520 A1 | 3/2002 | Nikiforov et al. | |
| 2002/0039280 A1 | 4/2002 | O'Connor et al. | |
| 2002/0041375 A1 | 4/2002 | Jensen et al. | |
| 2002/0046948 A1 | 4/2002 | Chow et al. | |
| 2002/0048768 A1 | 4/2002 | Nikiforov | |
| 2002/0049694 A1 | 4/2002 | Parce | |
| 2002/0052696 A1 | 5/2002 | Gallagher et al. | |
| 2002/0055149 A1 | 5/2002 | Kopf-Sill | |
| 2002/0076697 A1 | 6/2002 | Nikiforov | |
| 2002/0079008 A1 | 6/2002 | Chien et al. | |
| 2002/0081222 A1 | 6/2002 | Karp | |
| 2002/0084185 A1 | 7/2002 | Sundberg et al. | |
| 2002/0086340 A1 | 7/2002 | Veerapandian et al. | |
| 2002/0086439 A1 | 7/2002 | Nagle et al. | |
| 2002/0092973 A1 | 7/2002 | Nagle et al. | |
| 2002/0097398 A1 | 7/2002 | Parce | |
| 2002/0108096 A1 | 8/2002 | Lee et al. | |
| 2002/0110926 A1 | 8/2002 | Kopf-Sill et al. | |
| 2002/0112961 A1 | 8/2002 | O'Connor et al. | |
| 2002/0117517 A1 | 8/2002 | Unger et al. | |
| 2002/0119536 A1 | 8/2002 | Stern | |
| 2002/0123133 A1 | 9/2002 | Mehta et al. | |
| 2002/0124896 A1 | 9/2002 | O'Connor et al. | |
| 2002/0125139 A1 | 9/2002 | Chow et al. | |
| 2002/0127149 A1 | 9/2002 | Dubrow et al. | |
| 2002/0128593 A1 | 9/2002 | Sjolander et al. | |
| 2002/0132265 A1 | 9/2002 | Kopf-Sill | |
| 2002/0138209 A1 | 9/2002 | Gallagher | |
| 2002/0142618 A1 | 10/2002 | Parce et al. | |
| 2002/0144774 A1 | 10/2002 | McReynolds | |
| 2002/0144895 A1 | 10/2002 | Stern et al. | |
| 2002/0153046 A1 | 10/2002 | Dantsker et al. | |
| 2002/0153047 A1 | 10/2002 | Parce et al. | |
| 2002/0155010 A1 | 10/2002 | Karp et al. | |
| 2002/0158022 A1 | 10/2002 | Huang et al. | |
| 2002/0159919 A1 | 10/2002 | Churchill et al. | |
| 2002/0160139 A1 | 10/2002 | Huang et al. | |
| 2002/0166582 A1 | 11/2002 | O'Connor et al. | |
| 2002/0166585 A1 | 11/2002 | O'Connor et al. | |
| 2002/0166768 A1 | 11/2002 | Dubrow | |
| 2002/0177238 A1 | 11/2002 | Karp et al. | |
| 2002/0179445 A1 | 12/2002 | Alajoki et al. | |
| 2002/0180963 A1 | 12/2002 | Chien et al. | |
| 2002/0187074 A1 | 12/2002 | O'Connor et al. | |
| 2002/0187513 A1 | 12/2002 | Kopf-Sill et al. | |
| 2002/0187560 A1 | 12/2002 | Pezzuto et al. | |
| 2002/0187564 A1 | 12/2002 | Chow et al. | |
| 2002/0192719 A1 | 12/2002 | Nikiforov et al. | |
| 2002/0197603 A1 | 12/2002 | Chow et al. | |
| 2002/0197630 A1 | 12/2002 | Knapp et al. | |
| 2002/0198694 A1 | 12/2002 | Yang et al. | |
| 2003/0003026 A1 | 1/2003 | Parce et al. | |
| 2003/0005967 A1 | 1/2003 | Karp et al. | |
| 2003/0011382 A1 | 1/2003 | Chow et al. | |
| 2003/0015429 A1 | 1/2003 | Dubrow et al. | |
| 2003/0015672 A1 | 1/2003 | Gallagher | |
| 2003/0017085 A1 | 1/2003 | Kercso et al. | |
| 2003/0021725 A1 | 1/2003 | Unno et al. | |
| 2003/0027225 A1 | 2/2003 | Wada et al. | |
| 2003/0027345 A1 | 2/2003 | Friswell et al. | |
| 2003/0036080 A1 | 2/2003 | Jensen et al. | |
| 2003/0080442 A1 | 5/2003 | Unger | |
| 2003/0094953 A1 | 5/2003 | Brooks et al. | |
| 2003/0104466 A1 | 6/2003 | Knapp et al. | |
| 2003/0116738 A1 | 6/2003 | O'Connor et al. | |
| 2003/0124736 A1 | 7/2003 | Manz et al. | |
| 2003/0129756 A1 | 7/2003 | Thorne, IV et al. | |
| 2003/0138359 A1 | 7/2003 | Chow et al. | |
| 2003/0138829 A1 | 7/2003 | Unger et al. | |
| 2003/0148922 A1 | 8/2003 | Knapp et al. | |
| 2003/0150555 A1 | 8/2003 | Gandhi et al. | |
| 2003/0159742 A1 | 8/2003 | Karp et al. | |
| 2003/0170903 A1 | 9/2003 | Johnson et al. | |
| 2003/0186295 A1 | 10/2003 | Colin et al. | |

| | | |
|---|---|---|
| 2003/0198576 A1 | 10/2003 | Coyne et al. |
| 2003/0215855 A1 | 11/2003 | Dubrow et al. |
| 2003/0215862 A1 | 11/2003 | Parce et al. |
| 2003/0215957 A1 | 11/2003 | Lemmo et al. |
| 2003/0230486 A1 | 12/2003 | Chien et al. |
| 2004/0005247 A1 | 1/2004 | Karp |
| 2004/0009545 A1 | 1/2004 | Farinas et al. |
| 2004/0018115 A1 | 1/2004 | Karp |
| 2004/0019300 A1 | 1/2004 | Leonard |
| 2004/0026617 A1 | 2/2004 | Gregori et al. |
| 2004/0028559 A1 | 2/2004 | Schuck |
| 2004/0048299 A1 | 3/2004 | Parce et al. |
| 2004/0048360 A1 | 3/2004 | Wada et al. |
| 2004/0053315 A1 | 3/2004 | Spaid et al. |
| 2004/0053422 A1 | 3/2004 | Chan et al. |
| 2004/0067597 A1 | 4/2004 | Datwani et al. |
| 2004/0072278 A1 | 4/2004 | Chou et al. |
| 2004/0080744 A1 | 4/2004 | Hobbs |
| 2004/0089057 A1 | 5/2004 | Hobbs et al. |
| 2004/0092033 A1 | 5/2004 | Gustafson et al. |
| 2004/0118189 A1 | 6/2004 | Karp et al. |
| 2004/0179972 A1 | 9/2004 | Karp et al. |
| 2004/0180377 A1 | 9/2004 | Manger et al. |
| 2004/0203055 A1 | 10/2004 | Kennedy et al. |
| 2004/0208794 A1 | 10/2004 | Karg et al. |
| 2004/0209381 A1 | 10/2004 | Peters et al. |
| 2004/0217279 A1 | 11/2004 | Hobbs et al. |
| 2004/0224325 A1 | 11/2004 | Knapp et al. |
| 2004/0226884 A1 | 11/2004 | O'Connor et al. |
| 2004/0238401 A1 | 12/2004 | Greenstein et al. |
| 2004/0253545 A1 | 12/2004 | David |
| 2005/0003554 A1 | 1/2005 | Brasseur |
| 2005/0006238 A1 | 1/2005 | Jaffe |
| 2005/0011764 A1 | 1/2005 | Berndt et al. |
| 2005/0019792 A1 | 1/2005 | McBride et al. |
| 2005/0019794 A1 | 1/2005 | Nassef et al. |
| 2005/0032238 A1 | 2/2005 | Karp et al. |
| 2005/0056713 A1 | 3/2005 | Tisone et al. |
| 2005/0064465 A1 | 3/2005 | Dettloff et al. |
| 2005/0118073 A1 | 6/2005 | Facer et al. |
| 2005/0121324 A1 | 6/2005 | Park et al. |
| 2005/0133370 A1 | 6/2005 | Park et al. |
| 2005/0148093 A1 | 7/2005 | Chien |
| 2005/0170362 A1 | 8/2005 | Wada et al. |
| 2005/0182573 A1 | 8/2005 | Tripathi et al. |
| 2005/0197652 A1 | 9/2005 | Nat |
| 2005/0202470 A1 | 9/2005 | Sundberg et al. |
| 2005/0221385 A1 | 10/2005 | Nikiforov et al. |
| 2005/0257885 A1 | 11/2005 | Hobbs |
| 2005/0282175 A1 | 12/2005 | Taylor et al. |
| 2006/0006067 A1 | 1/2006 | Unger |
| 2006/0024751 A1 | 2/2006 | May et al. |
| 2006/0062696 A1 | 3/2006 | Chow et al. |
| 2006/0073035 A1 | 4/2006 | Sundararajan |
| 2006/0076068 A1 | 4/2006 | Young et al. |
| 2006/0211055 A1 | 9/2006 | Hafeman et al. |
| 2006/0227325 A1 | 10/2006 | Rulison et al. |
| 2006/0239860 A1 | 10/2006 | Evers et al. |
| 2006/0246493 A1 | 11/2006 | Jensen et al. |
| 2006/0246533 A1 | 11/2006 | Fathollahi et al. |
| 2007/0003447 A1 | 1/2007 | Gleason et al. |
| 2007/0048188 A1 | 3/2007 | Bigus |
| 2007/0052781 A1 | 3/2007 | Fraden et al. |
| 2007/0053799 A1 | 3/2007 | Bousse et al. |
| 2007/0059208 A1 | 3/2007 | Desmond |
| 2007/0059319 A1 | 3/2007 | Carlson et al. |
| 2007/0074972 A1 | 4/2007 | Nassef et al. |
| 2007/0080063 A1 | 4/2007 | Kennedy et al. |
| 2007/0086922 A1 | 4/2007 | Andersson et al. |
| 2007/0092975 A1 | 4/2007 | Potyrailo et al. |
| 2007/0099200 A1 | 5/2007 | Chow et al. |
| 2007/0183935 A1 | 8/2007 | Clemmens et al. |
| 2009/0020556 A1 | 1/2009 | Mukaddam et al. |
| 2009/0061428 A1 | 3/2009 | McBride et al. |

FOREIGN PATENT DOCUMENTS

| | | |
|---|---|---|
| AU | 200028936 B2 | 6/2000 |
| AU | 200071755 B2 | 3/2001 |
| AU | 200124770 B2 | 5/2001 |
| AU | 200118420 B2 | 8/2001 |
| AU | 2007200710 A1 | 3/2007 |
| CA | 2284612 A1 | 10/1998 |
| EP | 0 465 229 A | 1/1992 |
| EP | 0 703 364 A | 3/1996 |
| JP | 2000-220766 A | 8/2000 |
| JP | 2003-75407 A | 3/2003 |
| JP | 2004-230469 A | 8/2004 |
| JP | 2005-49357 A | 2/2005 |
| JP | 2005-509113 T | 4/2005 |
| JP | 2007-102573 A | 4/2007 |
| WO | WO 98/38622 A1 | 9/1998 |
| WO | WO 98/45481 A1 | 10/1998 |
| WO | WO 99/64840 A1 | 12/1999 |
| WO | WO 00/43748 A | 7/2000 |
| WO | WO 00/70353 A2 | 11/2000 |
| WO | WO 02/14926 A2 | 2/2002 |
| WO | WO 02/30486 A2 | 4/2002 |
| WO | WO 02/055198 A | 7/2002 |
| WO | WO 02/060582 A | 8/2002 |
| WO | WO 02/060582 A2 | 8/2002 |
| WO | WO 2004/009238 A1 | 1/2004 |
| WO | WO 2004/103563 A2 | 12/2004 |
| WO | WO 2005/072858 A1 | 8/2005 |
| WO | WO 2005/114223 A2 | 12/2005 |
| WO | WO 2006/060748 A2 | 6/2006 |
| WO | WO 2006/062805 A2 | 6/2006 |
| WO | WO 2006/121786 A1 | 11/2006 |
| WO | WO 2006/127191 A2 | 11/2006 |
| WO | WO 2007/033385 A2 | 3/2007 |
| WO | WO 2007/041619 A2 | 4/2007 |
| WO | WO 2007/044091 A2 | 4/2007 |
| WO | WO 2007/044432 A2 | 4/2007 |
| WO | WO 2007/044938 A2 | 4/2007 |
| WO | WO 2007/064404 A | 6/2007 |
| WO | WO 2007/064404 A2 | 6/2007 |
| WO | WO 2007/064635 A1 | 6/2007 |
| WO | WO 2008/089493 A | 7/2008 |
| WO | WO 2008/089493 A2 | 7/2008 |

OTHER PUBLICATIONS

European Search Report from European Application No. 08008435, dated Sep. 23, 2008.

* cited by examiner

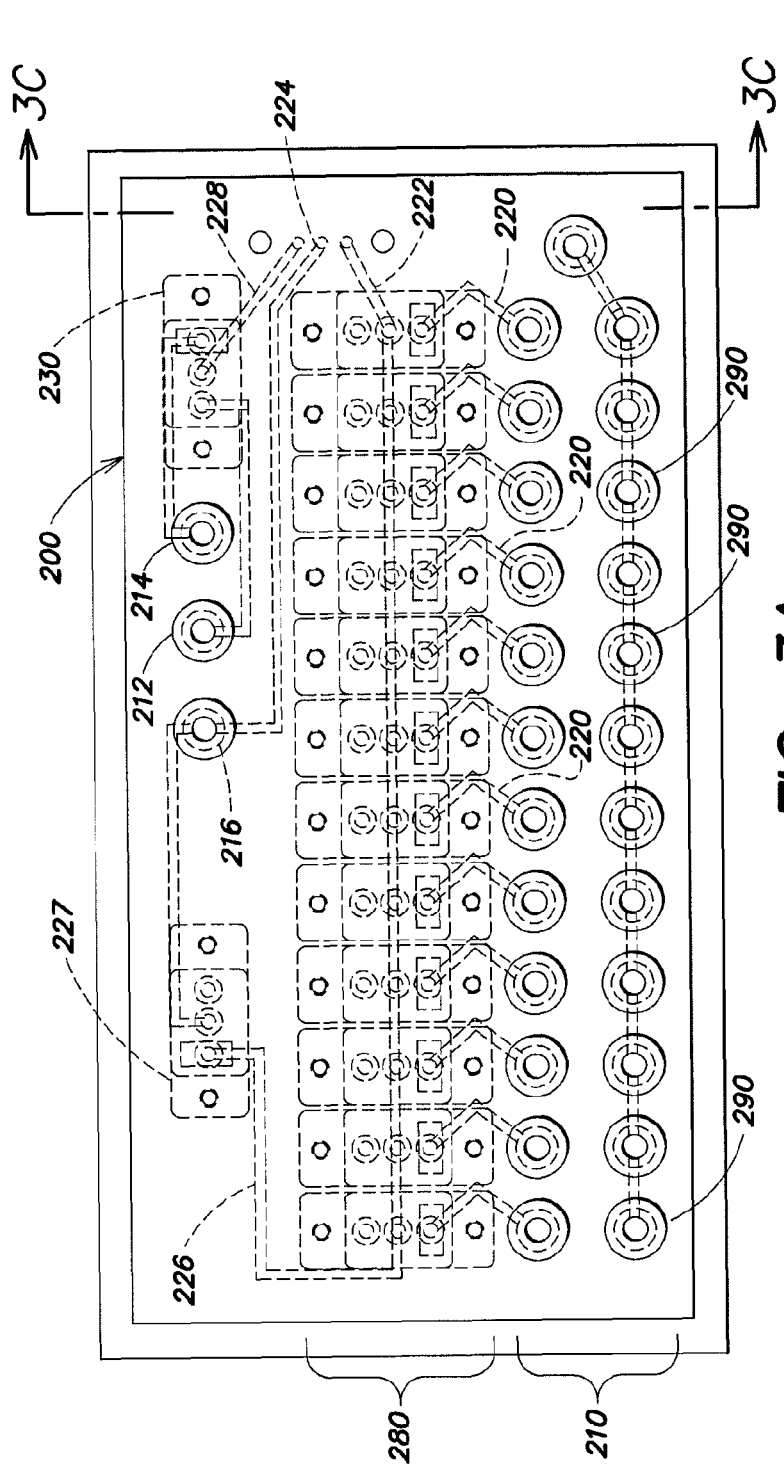
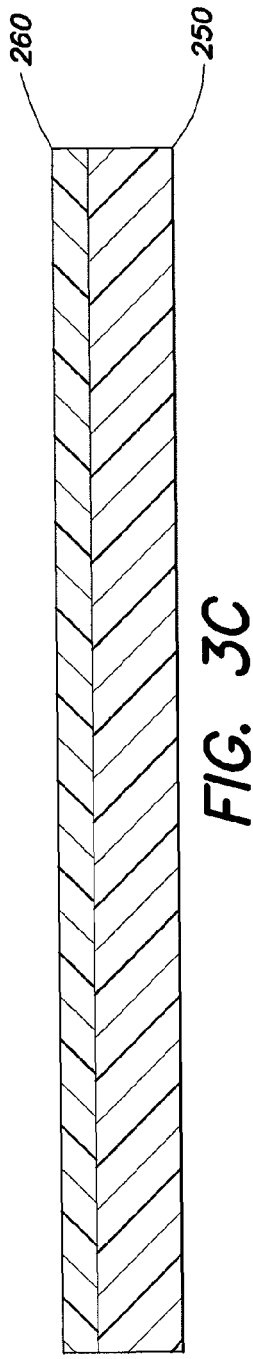
FIG. 3A
FIG. 3C

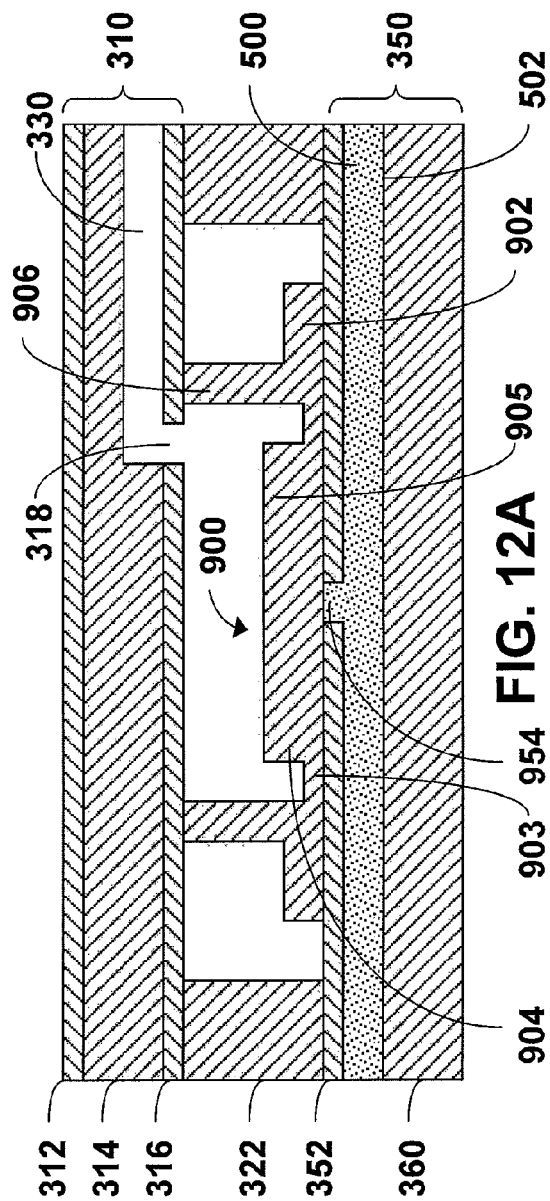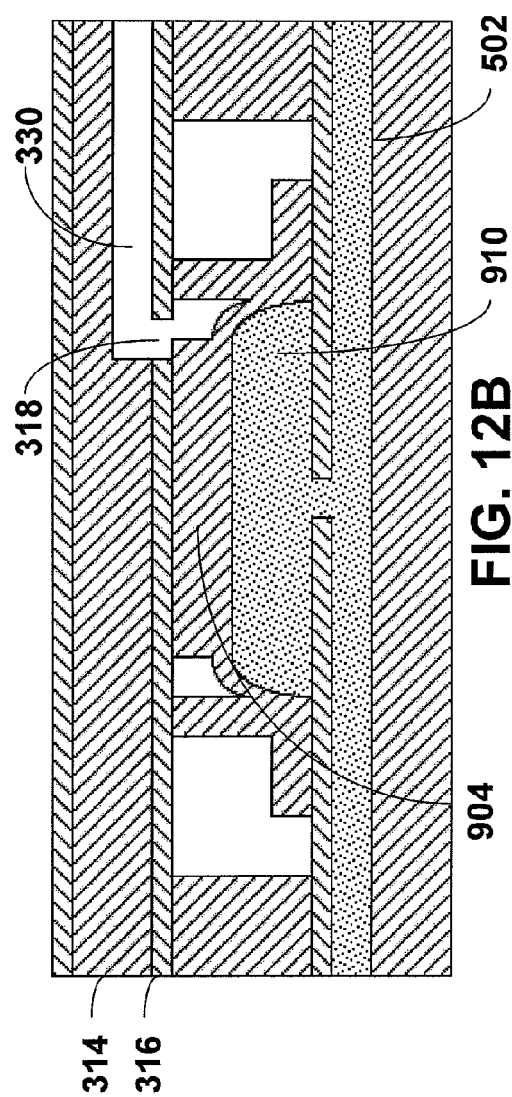

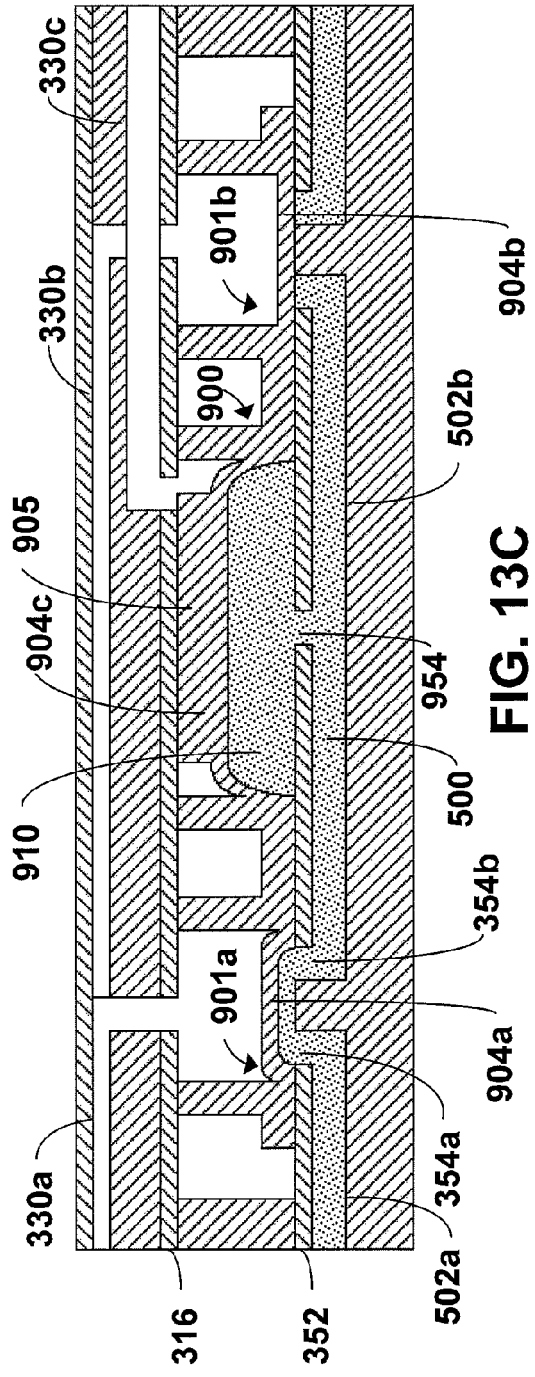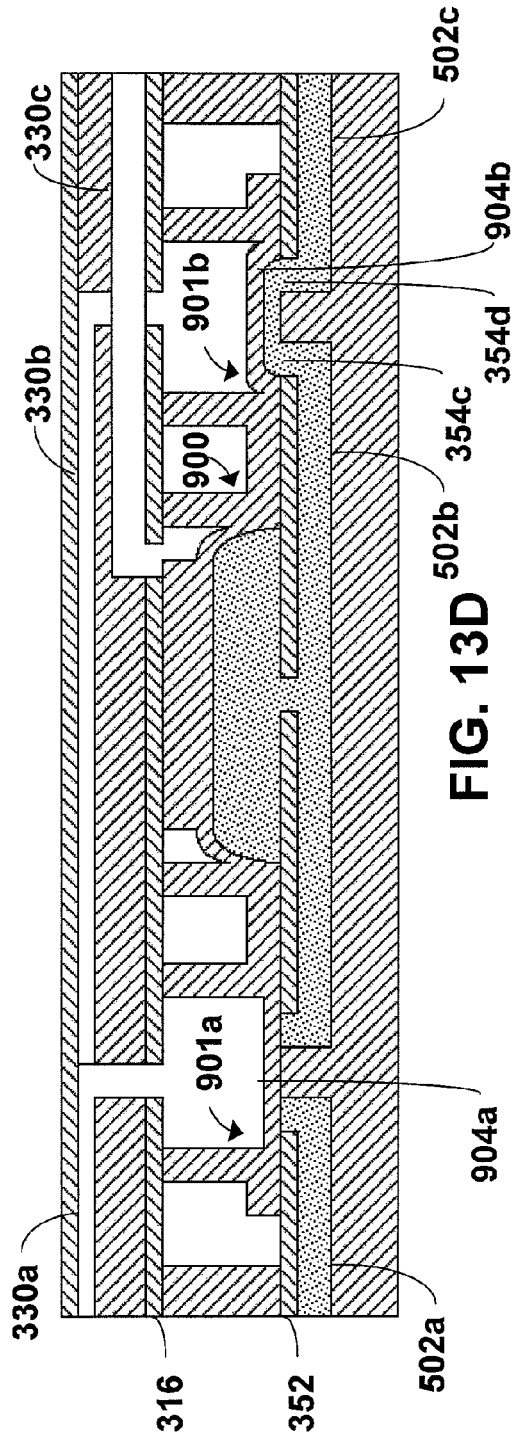

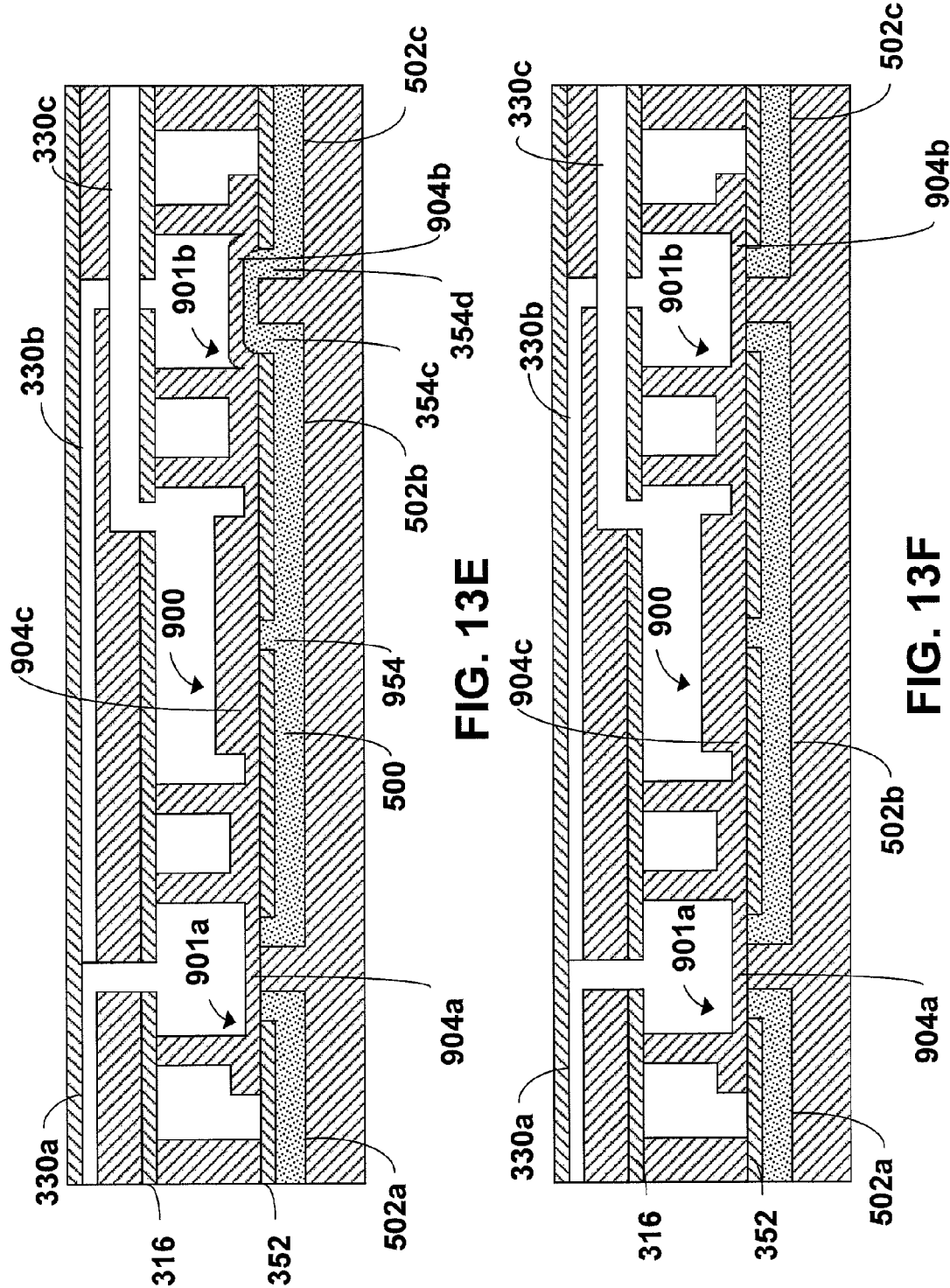

METERING ASSEMBLY AND METHOD OF DISPENSING FLUID

RELATED APPLICATIONS

This application is a continuation-in-part of U.S. application Ser. No. 11/880,112. entitled "METERING ASSEMBLY AND METHOD OF DISPENSING FLUID" filed Jul. 19, 2007 now abandoned.

BACKGROUND

1. Field

Aspects of the invention relate to apparatuses and methods for making the process of dispensing selected fluid samples in any combination of specified discrete volumes quick and efficient.

2. Discussion of Related Art

Challenges exist in designing fluid handling devices where often competing criteria must be met. In this regard, producing a fluid handling device that can effectively deliver fluid quickly and efficiently while being small and compact is challenging. For example, when dispensing fluid to a microplate, such as those used in chemical and/or biological analyses, the fluid must be dispensed at a relatively high throughput and in a compact arrangement. Various arrangements exist that attempt to meet these often competing criteria.

SUMMARY

In one illustrative embodiment, a metering assembly is provided. The metering assembly includes a fluidic chip and a plurality of metering chambers disposed within the fluidic chip. Each metering chamber defines a chamber volume. A plurality of valves communicates with each metering chamber. Each of the valves provides an outlet from the metering chamber and each of the valves is selectable to provide a discrete output volume that can be dispensed from the metering chamber.

In another illustrative embodiment, a metering assembly is provided. The metering assembly includes a fluidic chip and a plurality of metering chambers disposed within the fluidic chip. The metering chambers are adapted to receive a wash fluid. A plurality of purge channels is disposed in the fluidic chip and communicates respectively with the plurality of metering chambers. Each purge channel is adapted to receive at least one wash fluid. A plurality of purge valves communicates between each purge channel and each metering chamber. Each purge valve is adapted to be controlled to allow wash fluid to enter the metering chamber in a reverse flow to wash each of the corresponding metering chambers when the corresponding purge valve is actuated.

In still another illustrative embodiment, a metering assembly is provided. The metering assembly includes a fluidic chip and a plurality of metering chambers disposed within the fluidic chip. Each metering chamber defines a chamber volume. A plurality of valves communicates with each metering chamber. The valves are grouped into a plurality of subsets of valves. Each subset of valves defines a discrete output volume Is that can be dispensed from the metering chambers. Each subset of valves is commonly controlled.

In yet another embodiment, a metering assembly is provided. The metering assembly includes a fluidic chip and a plurality of metering chambers disposed within the fluidic chip. A plurality of pressure ports is also disposed within the fluidic chip. A plurality of multi-level valves is disposed within the fluid chip. Each valve communicates with a pressure port and a metering chamber. Application of pressure through the pressure port actuates the valve. Each of the multi-level valves includes a valve membrane having a thickness, a base surrounding the valve membrane, and a lip disposed between the base and the valve membrane. The base has a thickness that is greater than the thickness of the valve membrane and the lip has a height that is greater than the thickness of the base.

In another embodiment, a metering assembly is provided. The metering assembly includes a fluidic chip and a plurality of metering chambers disposed within the fluidic chip. A plurality of valves communicates with each metering chamber. The valves are grouped into a plurality of clusters of valves having a common substrate and a plurality of valve membranes formed thereon such that each valve in a cluster shares the common substrate. Each cluster of valves has at least one first valve in communication with a first metering chamber and having at least one second valve in communication with a second metering chamber.

In still another embodiment, a method of dispensing a fluid from a fluid chip is provided. The method includes a) selectively filling a plurality of fixed volume metering chambers in the fluid chip with a selected fluid; and b) outputting the fluid from the fixed volume metering chambers to corresponding output locations. The method also includes repeating a) and b) until a desired volume is obtained at each output location when the desired volume is larger than the fixed volume.

In yet another embodiment, a method of dispensing a fluid from a fluid chip is provided. The method includes a) filling a plurality of fixed volume metering chambers in the fluid chip with a selected fluid; and b) selectively outputting the fluid from the fixed volume metering chambers to corresponding output locations. The method also includes repeating a) and b) until a desired volume is obtained at each output location when the desired volume is larger than the fixed volume.

In yet another embodiment, a method of dispensing a fluid from a fluid chip is provided. The method includes a) providing a fluid chip having a plurality of metering chambers, each having a fixed fill volume and each providing a plurality of selectable discrete output volumes; b) selecting a fluid from a plurality of different fluids; c) determining a well fill volume of the selected fluid to be dispensed into each well; d) filling, to the fixed fill volume, at least a subset of the plurality of metering chambers with the selected fluid; e) selecting a first discrete output volume of the metering chamber; f) outputting to the well the fluid from each metering chamber in response to the selected first discrete output volume; g) accumulating a total output volume of fluid dispensed from each metering chamber; h) determining whether the discrete output volume from each metering chamber equals the accumulated total output volume; i) refilling the subset of the plurality of metering chambers with the selected fluid when the accumulated total output volume from each metering chamber is less than the well fill volume; j) selecting a second discrete output volume of the metering chambers; and k) outputting to the well the fluid from each metering chamber in response to the selected second discrete output volume. The method also includes l) repeating g) through k) until the accumulated volume equals the well fill volume. The method also includes repeating b) through l) for another one of the selected fluid from a plurality of different fluids.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A is a top view of one embodiment of the ingredient manifold;

FIG. 3C is a side view of the ingredient manifold of FIG. 3A;

FIGS. 12A and 12B are schematic cross-sectional views of an alternative embodiment of an arrangement for moving fluid; and FIGS. 13A-13F are schematic cross-sectional views of another alternative embodiment of an arrangement for moving fluid.

DETAILED DESCRIPTION

Figure 1:
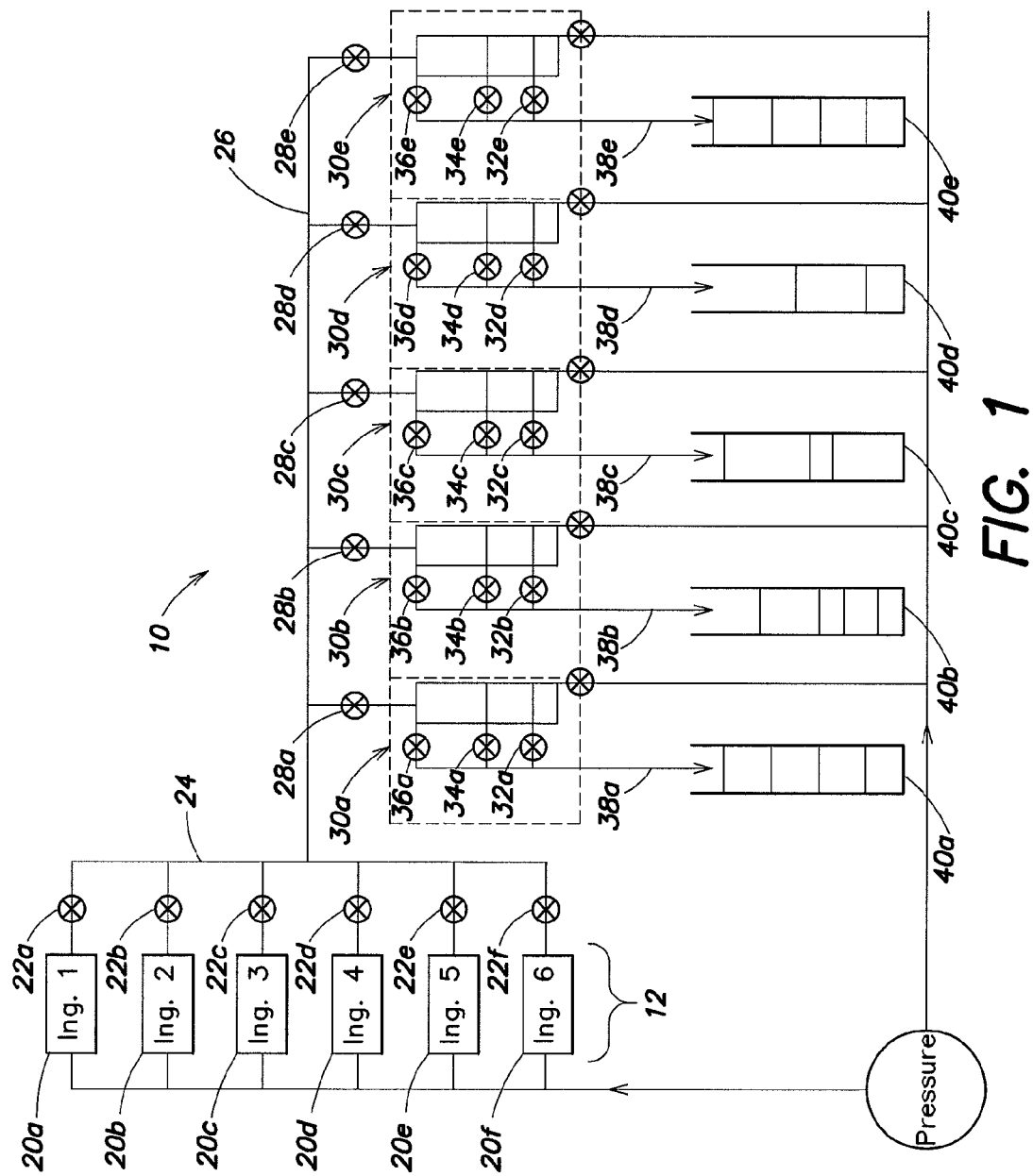
FIG. 1 is a schematic representation of a fluid handling device according to one aspect of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and/or variations thereof herein, is meant to encompass the items listed thereafter and equivalents thereof as well as additional items.

Aspects of the invention are directed to a fluid handling device that includes arrangement(s) and/or technique(s) for making the process of dispensing selected fluid samples in any combination of specified discrete volumes quick and efficient. The fluid handling device can include a number of components and includes a metering assembly.

The metering assembly includes a fluidic chip having metering chambers. In one embodiment, selectable outlet valves communicate with each metering chamber to provide a discrete dispensed volume. The valves may be commonly controlled and may be formed as multi-level valves. The valves may be grouped into common substrate valve clusters. In one embodiment, purge channels communicate with the metering chambers and controlled purge valves allow reverse flow wash fluid to wash the metering chambers. To actuate the valves, the metering assembly includes pressure ports whereby pressure within the ports causes the valves to open or close. In one embodiment, a method of dispensing a fluid from the fluid chip includes a) selectively filling (or filling) the metering chambers with a selected fluid; and b) outputting (or selectively outputting) the fluid to output locations. This process may be repeated until the desired output volume is attained and may be repeated for another fluid from a plurality of different fluids.

In one aspect, a process of dispensing a fluid into any number of output wells as desired is provided. The fluidic chip contains several metering chambers that each define a fixed fill volume, yet provide the ability to selectively dispense a number of discrete output volumes. It should be understood that the fluidic chip can be designed to include any desired number of metering chambers, corresponding to any desired number of output wells, as the present invention is not limited in this respect. It should also be understood that each metering chamber can be designed to define any suitable fixed volume. Each metering chamber can also be designed to define any number of suitable discrete output volumes. In a similar manner, any discrete output volume can be defined within the scope of the fixed volume of each metering chamber, as the present invention is not limited in this respect.

Any suitable ingredient can be dispensed from the metering chamber. In one embodiment, the particular ingredient selected to be dispensed can be one of any number of ingredients that are supplied from a source outside of the fluidic chip. It should be appreciated that there is no limitation to the variety of ingredients that may be supplied to the metering chambers within the fluidic chip.

In one embodiment, a desired volume of the selected ingredient to be dispensed into each well is predetermined. Then, the selected metering chambers that correspond to the selected wells to be dispensed into are filled with the selected ingredient. Afterwards, a suitable ingredient output volume is dispensed from each metering chamber and it is determined whether or not the actual output volume from each metering chamber is equivalent to the desired dispensed volume of the selected ingredient to be dispensed in each corresponding well.

In one embodiment, once the preferred volume of ingredient is dispensed from the respective metering chambers, the contents within the metering chambers are purged and washed through.

The process of filling, dispensing, and purging can then begin anew, if desired, with another selected ingredient for a number of selected output wells and corresponding metering chambers, which may be completely different, the same as, or partially the same as the prior selected wells and corresponding chambers. It should be appreciated that in several embodiments, the process can be made to be automated to run quickly and efficiently.

Another aspect relates to metering chambers that are provided in an efficiently designed structure and equipped with valves at pre-specified locations along the metering chamber such that the device has the ability to dispense out discrete output volumes depending on which valves of the metering chamber are activated. Once the metering chamber is filled, the volume fraction of the fluid sample within the metering chamber that will be dispensed is controlled by controlling which valves are opened or closed. As a result, a variety of output volumes may be dispensed from a single metering chamber through respective outlets. It should be appreciated that the present invention is not limited to the amount of discrete output volumes. Thus, in one embodiment, each metering chamber can provide at least two discrete output volumes. In another embodiment, each metering chamber can provide at least three discrete output volumes. In another embodiment, each metering chamber can provide at least four discrete output volumes. In another embodiment, each metering chamber can provide at least five discrete output volumes. In another embodiment, each metering chamber can provide at least ten discrete output volumes. Indeed, the present invention is not limited to having discrete sub-volume outputs at all as it is possible for only one output volume to be provided as well.

In one embodiment, each metering chamber can dispense up to 10 µL. It should also be understood that there is no limitation placed on the overall capacity of the chamber, as the present invention can be designed to support output volumes between approximately as small as 1 nL and as large as 10 L. In one embodiment, a small volume output that can dispensed from a metering chamber is between approximately 50 nL and approximately 500 nL. In another embodiment, a medium volume output that can be dispensed from a metering chamber is between approximately 500 nL and approximately 1 µL. In yet another embodiment, a large volume output that can be dispensed from a metering chamber is between approximately 1 µL and approximately 10 µL. It should also be appreciated that the present invention can incorporate one or more outlets so that Is all or a portion of the fixed camber volume can be dispensed.

The outlets can be of any form, as the present invention is not limited in this respect. For example, in one embodiment, the outlets included slender nozzles. In another embodiment, the outlets may be tubes that lead to other chambers in a larger system or act as dispensing nozzles themselves.

In one embodiment, the metering chambers are slender and tube-like, allowing for efficient usage of space taken up within the fluidic chip, and thus allowing the fluidic chip itself to be compact. In another embodiment, the tube-like structure may be formed along a meandering path with multiple bends, allowing for further space efficiency. The meandering path may turn 180 degrees several times or may follow some other path, as the present invention is not limited in this respect. Multiple bends may also allow for channels with greater aspect ratio so as to minimize bubble build up within the fluids running through the metering chamber.

In another embodiment, metering chambers are sectioned off into more bulbous protrusions, defining the discrete output volumes. These protrusions may have any shape including rectangular, spherical, or any other suitable form. In another embodiment, the metering chambers are large chambers with a low aspect ratio, allowing for discrete output volumes to be portioned off. In yet another embodiment, metering chambers are substantially planar and extend out in two directions. Other suitable forms for the metering chambers may be employed, as the present invention is not limited in this respect.

In another aspect, the fluid handling device is equipped with a cleaning system. In one embodiment, a set of purge channels connected to a main purge channel is provided that run purge ingredients (typically air and/or water) under high pressure throughout metering chambers and fill channels. In one embodiment, the purge ingredients are flowed through suitable channels through purge valve control in a reverse wash system. In order to minimize the possibility of ingredient cross-contamination, purge materials are flowed backwards through the metering chambers and fill channels before the next fluid ingredient is supplied for the subsequent dispense. In another embodiment, to minimize ingredient cross-contamination, purge materials may be flowed several times through the metering chambers and fill channels before the next fluid ingredient is supplied for the subsequent dispense. Indeed, a combination of Is flowing purge materials through the metering chambers in a reverse fashion along with flowing purge materials several times can also be performed before the next fluid ingredient is supplied for the next dispense. This process of filling and reverse washing can be repeatedly cycled for each of the fluid ingredients.

It should be appreciated that the purge ingredients used for reverse wash can include one or a combination of a variety of materials, not only air and/or water. For example, when the ingredients to be dispensed are not suitably washed with air and/or water, then different types of purge ingredients may be used, such as acetone, ethanol, nitrogen, carbon dioxide, or other suitable gaseous or fluidic ingredients or combinations thereof.

In one embodiment, for example, pressure inlets can force purge ingredients and remaining selected ingredients through the desired chambers. In another embodiment, vacuums can provide a pressure gradient, effectively pulling purge ingredients and remaining selected ingredients through the different chambers. In another embodiment, dynamic pressure variation that incorporates a combination of pressure buildup and vacuum could be used to further disturb residual fluid ingredients for more efficient washing. It should be understood that the present invention is not limited simply to reverse washing, and forward washing may also be a suitable wash method for the present invention. It should also be appreciated that washing between dispenses need not be performed, as the present invention is not limited in this respect.

As discussed above, each metering chamber may include several outlet valves, each corresponding to a specified discrete output volume from the metering chamber. In one aspect, the valves for each desired output volume from the metering chamber are commonly controlled together for all of the metering chambers within the fluidic chip. In this manner, when a particular output volume is to be dispensed from all of the metering chambers on a single fluid handling device, all of the valves that correspond to the desired output volume may be controlled together, further simplifying the complexity of control without compromising overall dispense efficiency.

It should be understood that the present invention is not limited only to valve control based on discrete output volumes. Thus, in one embodiment, each valve corresponding to one particular metering chamber for one particular discrete output volume may be controlled separately individually. In another embodiment, a first fraction of valves corresponding to a subgroup of metering chambers can be controlled together according to the corresponding discrete output volume of each valve. In a similar manner, a second fraction of valves corresponding to the same subgroup of metering chambers can be controlled together separately from the first fraction of valves. Likewise, different sets of valves corresponding to other subgroups of metering chambers can be controlled together as desired. Indeed, it should be appreciated that there is no limitation to be placed on the number of valves corresponding to any number of metering chambers within the fluid handling device. To be sure, the present invention may be designed for any type of valve control, common or separate, however it is suitably desired within the scope of the existing system.

A further aspect relates to the construction of the valves. In several embodiments, the valves include physical features that maximize their performance, particularly with regard to mechanical flexibility and structural integrity. In one embodiment, a multi-level valve construction is employed. The multi-level valves are made of a firm but compliant material or structure with an added base structure around the valve providing for extra surface area, which may give rise to a more effective air-tight seal. A lip that extends upwardly is also included in the multi-level valve to provide for an extra compression surface, as will be explained.

In one embodiment, the valves are controlled through a pressure inlet that either serves to push air against the valve membrane (closing the valve) or serves to refrain from applying pressure to the valve membrane (opening the valve). In some cases, a vacuum is applied to allow for enhanced fluid ingredient flow. It should also be appreciated that in another embodiment, the valve can be designed in such a way that application of pressure through an inlet to the valve membrane could serve to open the valve and that not applying pressure (or applying a vacuum) through an inlet could serve to close the valve.

It should be understood that the valves may be formed out of a wide variety of suitable materials. Thus, in one embodiment, the valves may be made of an elastomeric material such as silicone, rubber, polyurethane, polydimethylsiloxane, or any suitable polymeric equivalent or suitable combinations thereof. In another embodiment, the valves may be made of a suitable rigid material, such as a metal or a ceramic, that can be actuated through any appropriate arrangement, whether electrical or mechanical in nature. If a rigid material is used, a hinge or gateway that can be opened or closed may be employed.

In another aspect, clusters of valves may be molded together in a single elastomeric piece. In one embodiment, partial control of discrete output volumes to be dispensed from metering chambers that are located adjacent to one another may be provided. In this case, clusters of valves that partially control neighboring metering chambers allow for overall space conservation and ease of manufacture.

It should be appreciated that a number of alternative embodiments exist for clustering of valves. In one embodiment, a cluster of valves may be used to control every valved region of an individual metering chamber. In another embodiment, a cluster of valves may be in communication with only a portion of the valved regions for at least one metering chamber. In another embodiment, a cluster of valves may be in partial communication with at least two separate metering chambers. In another embodiment, a cluster of valves may be in partial communication with at least three separate metering chambers. In another embodiment, a cluster of valves could be in partial communication with at least four separate metering chambers. Indeed, in yet another embodiment, a cluster of valves may be in partial communication with only one metering chamber, as the present invention is not limited in this respect. In a similar manner, a cluster of valves may be in full communication with all of the metering chambers within the fluidic chip. It should be appreciated that there is no limitation to be placed on the manner in which clusters of valves partially (or fully) controlling regions in metering chambers are designed.

It should be appreciated that the above aspects may be employed in any suitable combination, as the present invention is not limited in this respect. Also, any or all of the above aspects may be employed in a fluid handling system for use with dispensing fluid to wells of a microplate; however, the present invention is not limited in this respect, as aspects may be used with any fluid dispensing systems. Various aspects and embodiments of the invention will now be described in more detail with respect to the accompanying drawing figures. The invention is not, however, limited to the aspects and embodiments shown.

Turning now to the figures, a schematic representation of one embodiment of a fluid handling device 10 is shown in FIG. 1. The fluid handling device 10 includes a collection of reservoirs, channels, and valves that are adapted for quick and efficient dispensing of selected ingredients into selected wells in predetermined output volumes. As shown in the schematic of FIG. 1, a number of different ingredients 12 are provided in corresponding source reservoirs 20a, 20b, 20c, 20d, 20e, and 20f and are connected to ingredient valves 22a, 22b, 22c, 22d, 22e, and 22f through which ingredients may be selectively supplied for further handling. Ingredients may be selected one at a time and subsequently allowed to flow into an ingredient channel 24. Channel 24 is directed into a main fill channel 26. In one embodiment, individual ingredient channels and fill channels that correspond to each source reservoir may be provided. It should be apparent that any number of source reservoirs and corresponding ingredient valves may be employed, as the present invention is not limited in this respect.

Continuing with the embodiment schematically shown in FIG. 1, the main fill channel 26 is connected to metering chambers 30a, 30b, 30c, 30d, and 30e, where flow is individually controlled via fill valves 28a, 28b, 28c, 28d, and 28e to completely fill each selected metering chamber with the desired ingredient.

It should be understood that in other embodiments, there may be any amount of metering chambers and corresponding fill valves for each metering chamber and that the number presented herein should not limit the present invention in any way. In one embodiment, there is at least one metering chamber. In another embodiment, there are at least two metering chambers. In another embodiment, there are at least three metering chambers. In another embodiment, there are at least four metering chambers. In another embodiment, there are at least five metering chambers. In another embodiment, there are at least twelve metering chambers. In another embodiment, there are at least ninety-six metering chambers. In one embodiment, the number of metering chambers corresponds to the number of wells employed in a microplate into which the fluid from the fluid handling device is dispensed.

Each metering chamber is also equipped with a plurality of small volume output valves 32a, 32b, 32c, 32d, and 32e, a plurality of medium volume output valves 34a, 34b, 34c, 34d, and 34e, and a plurality of large volume output valves, 36a, 36b, 36c, 36d, and 36e. These valves are employed to set the desired output volume that is to be dispensed from the respective metering chamber through dispense nozzles 38a, 38b, 38c, 38d, and 38e and into corresponding output wells 40a, 40b, 40c, 40d, and 40e. The particular volume dispensed will depend on which output valve is actuated for that ingredient within the metering chamber. It should be appreciated that in other embodiments, there may be any number of output valves that each metering chamber is equipped with, allowing for any number of desired output volumes to be dispensed from the respective metering chamber.

It should be appreciated that there is no limitation placed on the number of ingredients that may be selected and subsequently dispensed. Thus, in one embodiment, there is at least one ingredient from which to select and dispense. In another embodiment, there are at least two ingredients from which to select and dispense. In another embodiment, there are at least three ingredients from which to select and dispense. In another embodiment, there are at least four ingredients from which to select and dispense. In another embodiment, there are at least five ingredients from which to select and dispense. In another embodiment, there are at least six ingredients from which to select and dispense. In another embodiment, there are at least twenty-five ingredients from which to select and dispense. In another embodiment, there are at least ninety-six ingredients from which to select and dispense. It should also be understood that the ingredients to be selected from and dispensed can take on any suitable form, phase, or mixture thereof. For example, ingredients can be in liquid, gaseous, or solid phase. Furthermore, ingredients can also be a combination of one of the aforementioned phases, such as in an emulsion, immiscible mixture, or in a dissolved state.

It should also be appreciated that the manner in which the ingredients are selected and outputted to the wells can also be performed in a number of different ways. In one embodiment, at least one individual fill channel through which ingredients are deposited into metering chambers is provided. In another embodiment, at least two individual fill channels through which ingredients are deposited into metering chambers is provided. In another embodiment, at least three individual fill channels through which ingredients are deposited into metering chambers is provided. In another embodiment, at least four individual fill channels through which ingredients are deposited into metering chambers is provided. In another embodiment, at least five individual fill channels through which ingredients are deposited into metering chambers is provided. In another embodiment, at least twelve individual fill channels through which ingredients are deposited into metering chambers is provided. In another embodiment, at least ninety-six individual fill channels through which ingredients are deposited into metering chambers is provided. In general, it should be appreciated that the number of ingredients, reservoirs, channels, and valves can be scaled to whatever number is desired.

In addition, the number of metering chambers does not have to coincide with the number of output wells. Having metering chambers dispense into multiple output wells can be accomplished, for example, by incorporating mobility into the system where metering chamber nozzles are able to dispense out and move over to selected wells for subsequently dispensing. In the same way, the system could have metering chambers dispense out into selected output wells and then have other output wells move under selected output nozzles for subsequent dispensing. In one embodiment, it is possible for one metering chamber to dispense into at least two output wells. In another embodiment, it is possible for one metering chamber to dispense into at least three output wells. In another embodiment, it is possible for one metering chamber to dispense into at least ninety-six output wells.

Figure 2A:
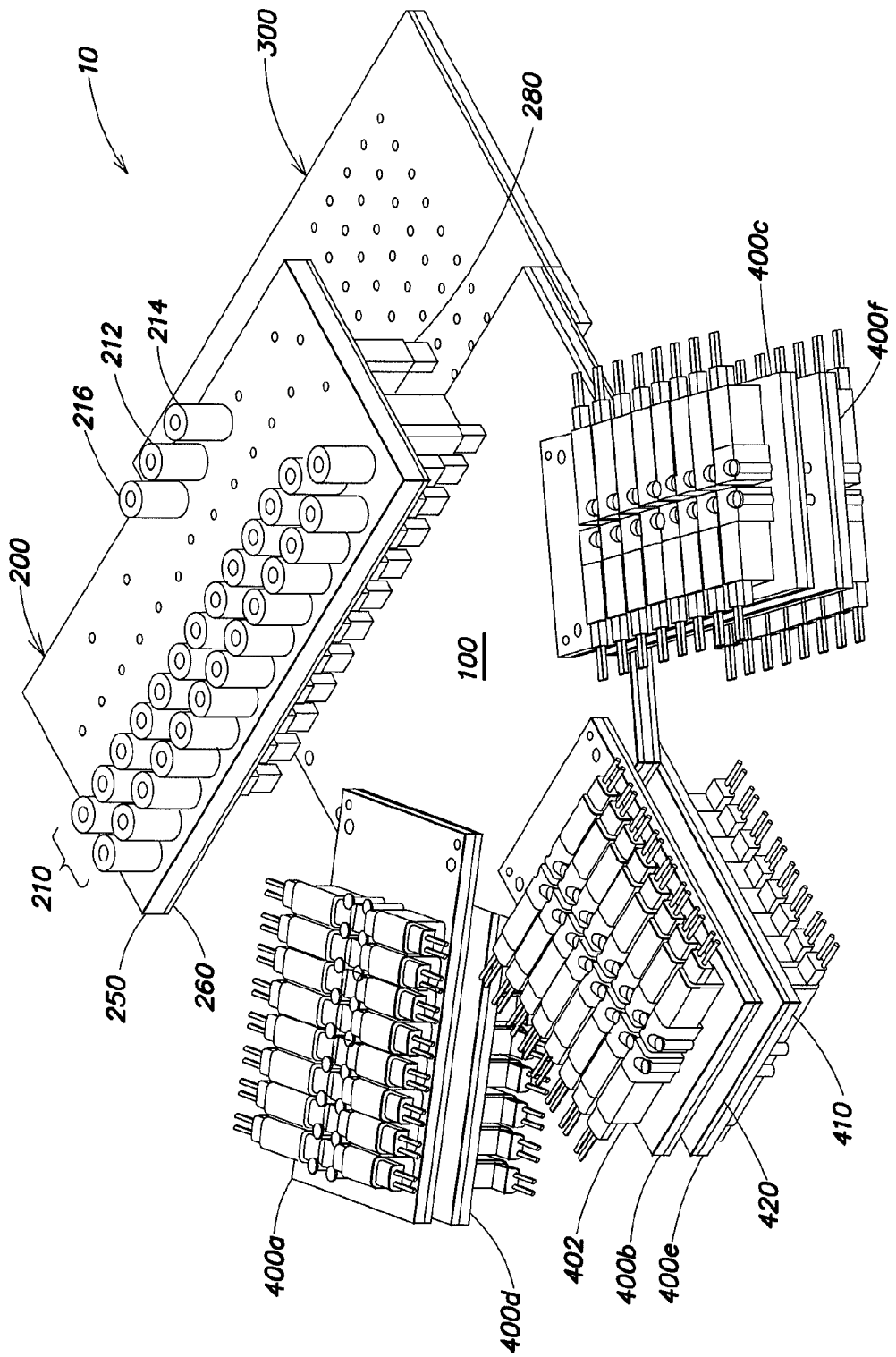
FIG. 2A is a perspective view of one embodiment of a fluid handling device with a manifold collector, an ingredient manifold, a metering assembly, and control modules according to one embodiment of the invention.
Figure 2B:
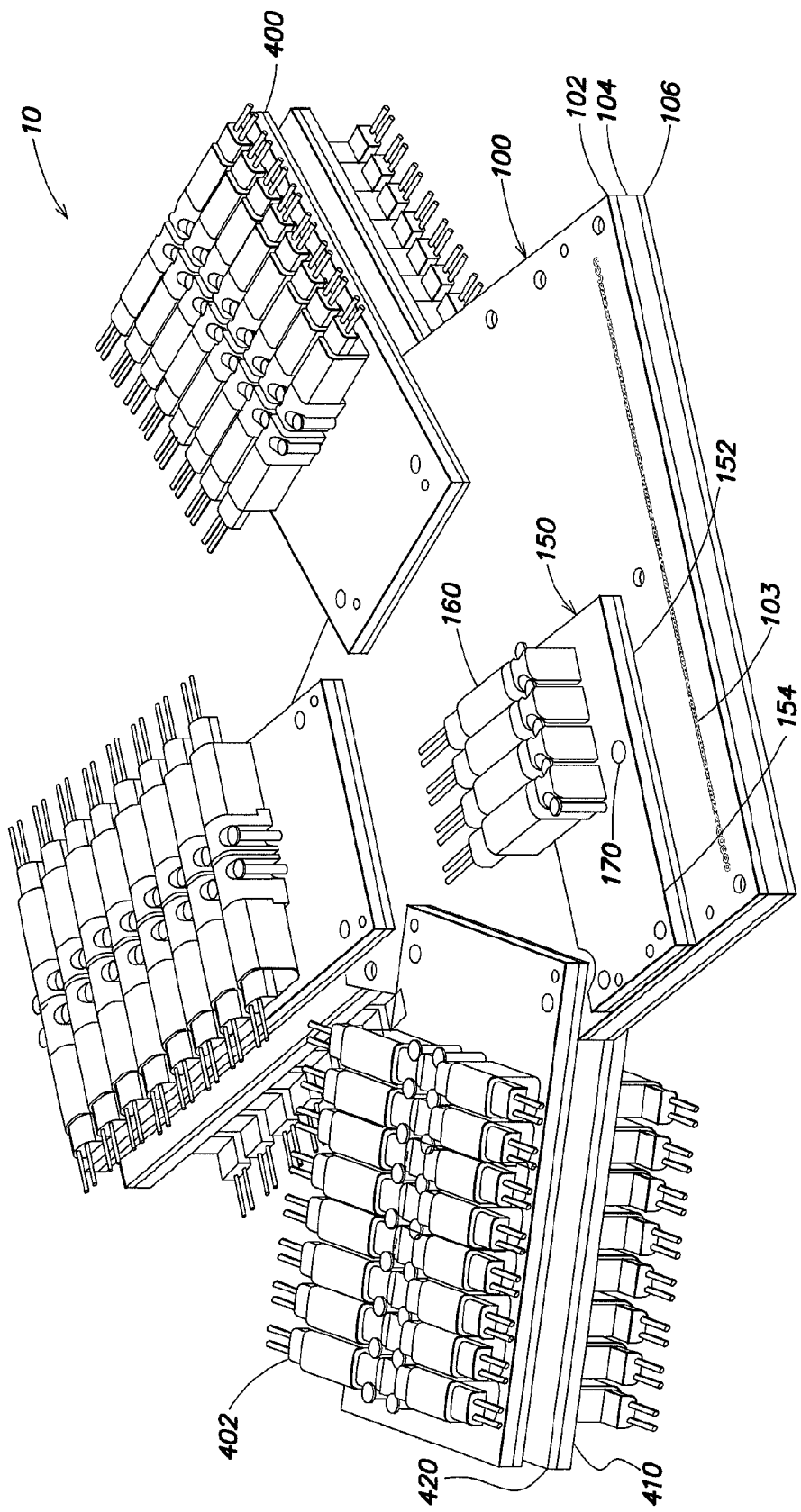
FIG. 2B is a bottom perspective view of the fluid handling device of FIG. 2A, showing a shared control module.

FIGS. 2A and 2B are exploded perspective representations of one embodiment of a fluid handling device 10. The device includes five main components, a manifold collector 100, a shared control module 150, an ingredient manifold 200, a fluidic chip 300 having conduits to allow fluid flow there through, and several control modules, six of which are shown, namely 400a, 400b, 400c, 400d, 400e, and 400f. A bottom perspective view of the same components without the fluidic chip 300 or the ingredient manifold 200 is shown in FIG. 2B. The manifold collector 100 includes slots where the other four components may be attached. One such slot 103 is shown for attachment of the fluidic chip 300.

Fluid flow may be controlled using any suitable arrangement. In one embodiment, fluid is controlled with solenoid actuated valves, as will be explained in greater detail below. In one embodiment, different groups of valves on the fluidic chip 300 share control from single solenoid control sources. These shared solenoid control sources are arranged together on a shared control module 150 that is attached to the underside of the manifold collector 100. In one embodiment, the shared control module 150 includes shared valve solenoids 160 that allow for control of shared purge and volume output sizes. The ingredient manifold 200 includes connections for where ingredient reservoirs 210, a purge air tube 212, a wash water tube 214, and an overflow and waste tube 216 may be plugged in for ingredient and purge material supply into the fluidic chip 300 and providing waste out from the fluidic chip 300. The fluidic chip 300 includes a metering assembly where fluid flow of ingredients and purge materials, metering of ingredients, and eventual dispensing occurs. Control modules 400a, 400b, 400c, 400d, 400e, and 400f, attached to opposite sides of the manifold collector 100, include solenoids that enable control of the different valves within the fluidic chip 300. Included within each control module 400 shown in FIGS. 2A and 2B are sixteen individual fill solenoids 402 that control ingredient filling into respective metering chambers within the fluidic chip 300. This arrangement of control modules gives rise to ninety-six separately controlled fill valves for each metering chamber. It should be appreciated that additional control modules may be used and/or more or less solenoid valves on each control module may also be employed.

The shared control manifold 150 is disposed adjacent to the manifold collector 100 and includes shared valve solenoids 160 which serve to commonly control each selectable discrete output volume dispense as well as the purge wash. In one embodiment, the small output volumes are controlled by a single solenoid valve. The medium output volumes are controlled by a different single solenoid valve, and the large output volumes are controlled by a yet another single solenoid valve. The purge wash is controlled by a single solenoid valve. It should be appreciated that each of the discrete output volume dispenses as well as the purge do not have to be commonly controlled. In fact, the present invention may be designed in such a manner that each valve on the entire fluidic chip 300 may be controlled individually by separate valves.

Figure 8B:
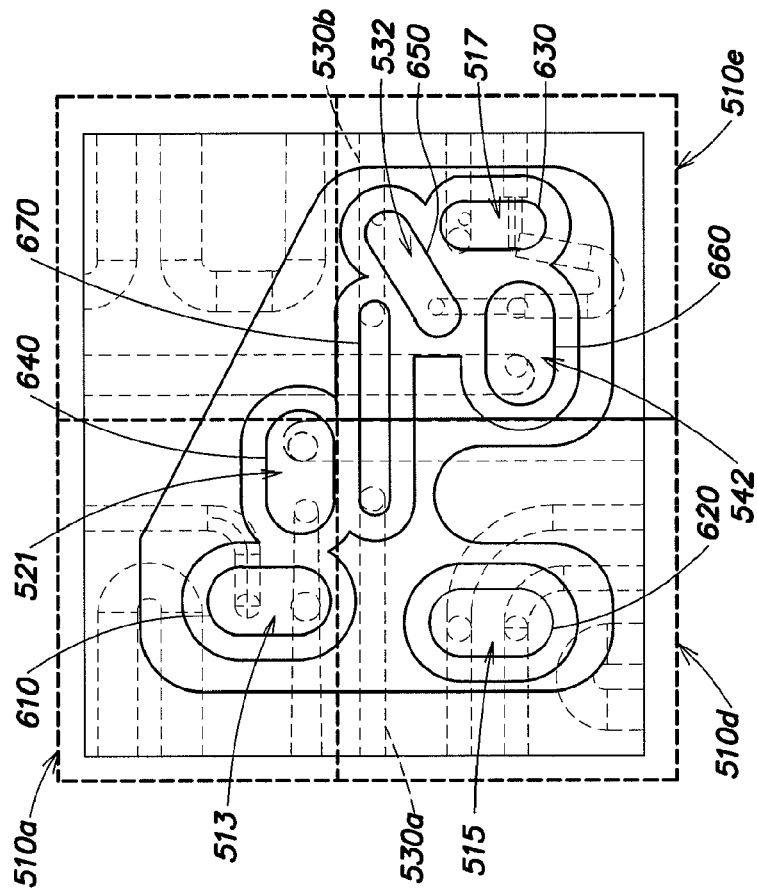
FIG. 8B is an enlarged top view of a valve cluster placed between metering chambers.

The shared control manifold 150 also incorporates an overflow pressure supply port 170 which functions to control pressure to overflow valves 650, shown in FIG. 8B, for enhanced fill rate control. In this manner, such pressure control serves to minimize excessive ingredient waste as overflow valve pressure may be controlled separately than for the other valves. A shared manifold connection 180 allows the shared control manifold 150 to communicate with the manifold collector 100. The manifold collector 100 also includes shared valve connections 190 which serve as conduits between the valves on the shared control manifold 150 to communicate with the shared valves on the fluidic chip 300.

Figure 2C:
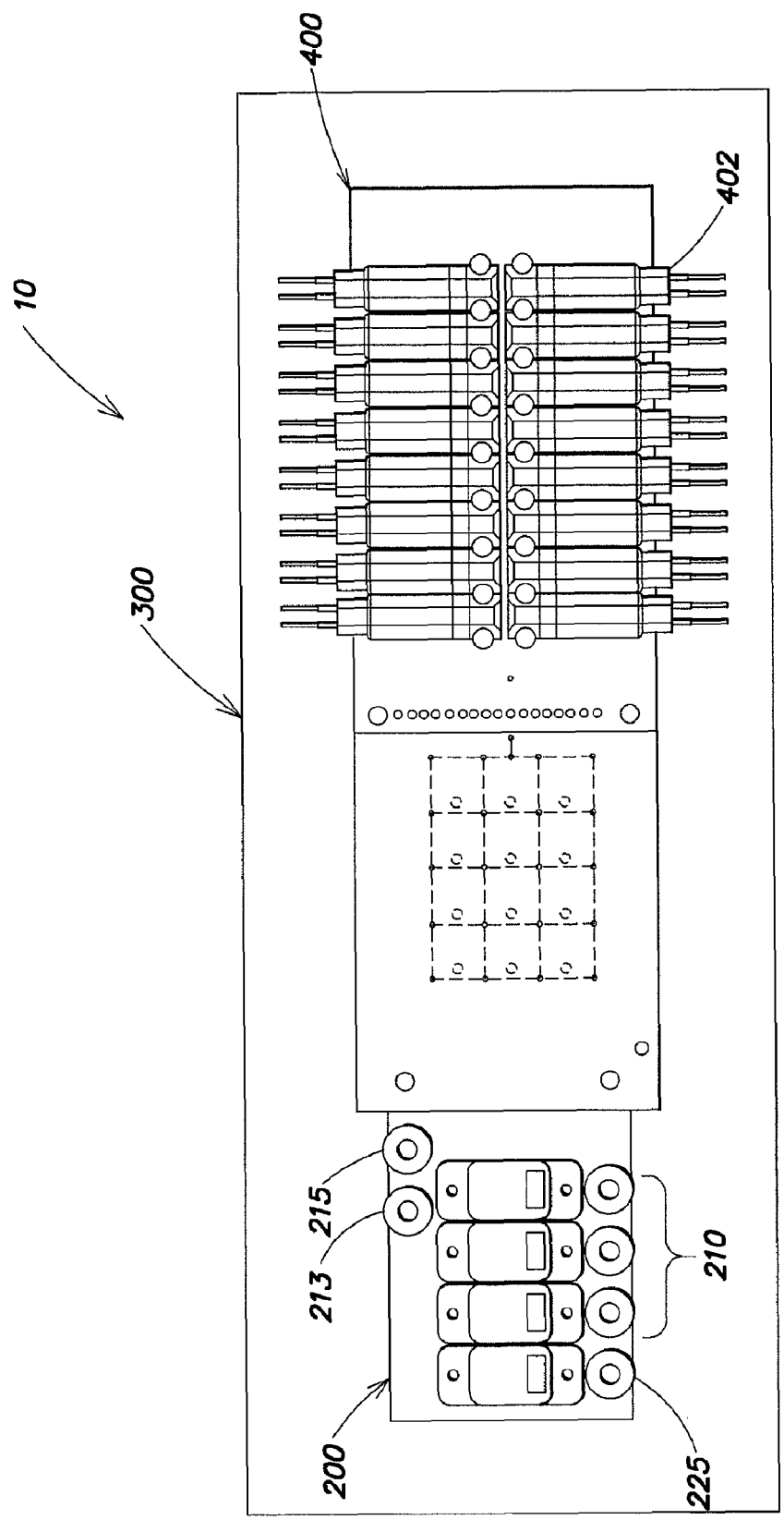
FIG. 2C is a top view of another embodiment of the fluid handling device.

FIG. 2C is a representation of another embodiment of a fluid handling device 10. Is The device includes three main components, an ingredient manifold 200, a fluidic chip 300, and a control module 400. In this embodiment, there is no shared control module. The ingredient manifold 200 includes connections for where ingredient reservoirs 210, an air and water supply tube 213, a waste container 225, and an overflow container 215 may be plugged in for ingredient and purge material supply into the fluidic chip 300 and providing waste out from the fluidic chip 300. The fluidic chip 300 includes a metering assembly where fluid flow of ingredients and purge materials, metering of ingredients, and eventual dispensing occurs. A control module 400 includes solenoid valves that enable control of the different valves within the fluidic chip 300. Included within a control module 400 are individual fill solenoids 402 that control ingredient filling into the fluidic chip 300.

It should be appreciated that the fluid handling device should not be limited to the present embodiments. For example, in one embodiment, the ingredient supply, the fluidic metering and dispensing, and the control supply aspects could all be combined together on one general manifold. In another embodiment, the ingredient supply and the fluidic metering could be combined together on one common substrate and the control supply could be attached thereon. In this way, the processes of ingredient and purge material supply, metering, and dispensing would occur on one multi-purpose substrate while the components that control how the processes are performed would be disposed at another region of the overall device. In a separate embodiment, the ingredient supply and the control supply could be combined together on one substrate and the fluidic metering could be attached thereon. In this regard, ingredient and purge material supply and aspects that allow for control would be provided at one common region and fluidic metering and dispensing would occur at a separate section of the device. In a different embodiment, the fluidic metering and the control supply could be combined together on one separate substrate and the ingredient supply could be attached thereon. In this manner, aspects that allow for control as well as fluidic metering and dispensing would occur together on that substrate while ingredient and purge materials would be supplied from a different region of the overall device. In another embodiment, structural aspects of the ingredient supply, control means, and metering and dispensing may be intermingled together. Indeed, it should be appreciated that there are several design embodiments that may be incorporated into the device and are all meant to be understood as part of the present invention.

In one embodiment, a manifold collector 100 is also made up of thermoplastic layers, shown in FIG. 2B. A collector thick layer 104 is sandwiched between a collector thin top layer 102 and a collector thin bottom layer 106. In one embodiment, the layers are held together by screws. In another embodiment, the layers are held together by a suitable adhesive material. In a different embodiment, the layers are heat sealed together. It should be understood that the manifold collector 100 is not limited to being a layered device, but could be a single monolithic piece. Indeed, in another embodiment, the manifold collector 100 could also be made up of any suitable number of layers. In addition, the layer material is not meant to be limited to thermoplastic, but could be a number of suitable materials, for example, a metal or ceramic.

In one embodiment, the shared control manifold 150 is also made up of thermoplastic layers, shown in FIG. 2B. A shared manifold thin layer 152 is disposed adjacent to a shared manifold thick layer 154. In one embodiment, the layers are held together by screws. In another embodiment, the layers are held together by a suitable adhesive material. In a different embodiment, the layers are heat sealed together. It should be understood that the manifold collector 100 is not limited to being a layered device, but could be a single monolithic piece. Indeed, in another embodiment, the manifold collector 100 could also be made up of any suitable number of layers. In addition, the layer material is not meant to be limited to thermoplastic, but could be a number of suitable materials, for example, a metal or ceramic.

As best shown in FIG. 3A, the ingredient manifold 200 functions to bring fluid to the fluidic chip 300 and carry waste out from the fluidic chip 300. In one embodiment, the ingredient manifold 200 is also made up of a number of layers, that are best depicted in FIG. 3C, which is a cross section taken along line 3C-3C of FIG. 3A. An ingredient manifold thick layer 250 may be a thermoplastic piece with milled channels attached to an ingredient manifold thin layer 260 which can be a thinner thermoplastic element that seals off appropriate channels, acting as a suitable complement to the thick layer 250. In one embodiment, the ingredient manifold thick layer 250 and thin layer 260 are held together by screws. In another embodiment, the ingredient manifold thick layer 250 and thin layer 260 are held together by a suitable adhesive material. In a different embodiment, the layers are heat sealed. It should be understood that the ingredient manifold 200 is not limited to being a layered device, but could be a single monolithic piece. Indeed, in another embodiment, the ingredient manifold 200 could also be made up of any suitable number of layers. In addition, the layer material is not meant to be limited to thermoplastic, but could be a number of suitable materials, for example, a metal or ceramic.

Ingredient solenoid valves 280 are also assembled on to the ingredient manifold 200, as shown in FIG. 3A, contributing in controlling ingredient flow into the fluidic chip 300 and waste flow outward from the fluidic chip 300. Solenoid valves 280 may be either in an open or closed state. An instant tube fitting 290 may also be in place, connecting tubing and external fluid reservoirs to channels in the ingredient manifold 200. In one embodiment, the instant tube fitting 290 can be adapted to be screwed into the ingredient manifold 200. In another embodiment, an adhesive may be used to properly place and hold the instant tube fitting 290 in the ingredient manifold 200. In a different embodiment, the instant tube fitting 290 may be properly placed in the ingredient manifold 200 and heat sealed. Within the ingredient manifold 200 are ingredient fill channels 220 that are connected with ingredient reservoirs 210 so that when an appropriate solenoid valve 280 is actuated to be open, a selected ingredient from a respective ingredient reservoir 210 may flow into an ingredient fill channel 220 and subsequently into a main fill channel 222, where flow may continue on to metering chambers 510 within the fluidic chip 300 (See FIG. 7). In this case, there are twenty five different ingredient reservoirs 210 that may each be selected to fill metering chambers in the fluidic chip 300. It should be appreciated that any number of ingredients may be incorporated into the ingredient manifold 200.

In one embodiment, overflow outlet 224 is provided on ingredient manifold 200. Excess ingredient that flows through and past the metering chambers exits the overflow outlet 224 and flows into a separate overflow and waste container 216, shown in FIG. 3A. In another embodiment, when the fluidic chip 300 is washed, waste may flow through the same main fill channel 222 line backwards from the fluidic chip 300 into a waste channel 226, through a waste valve 227, and eventually into the overflow and waster container 216.

In one embodiment, purge channel 228 is provided on ingredient manifold 200. Purge channel 228 supplies pressurized air and/or water or other suitable fluid to push ingredients through the different channels associated with the device. A three way solenoid valve 230 may be located on the ingredient manifold 200, switching purge ingredients between air and water which are supplied from a purge air tube 212 and a wash water tube 214.

Figure 3B:
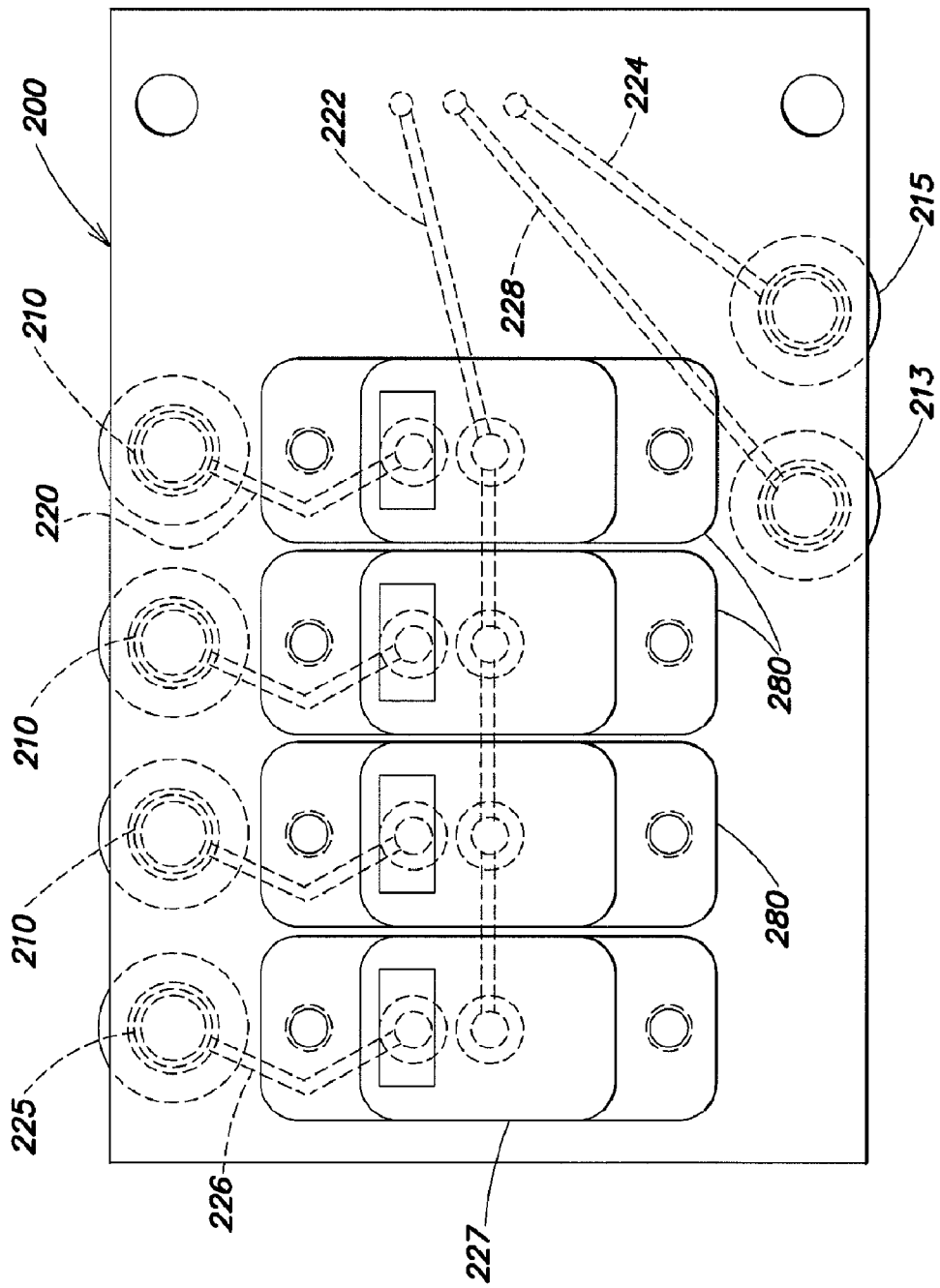
FIG. 3B is a top view of another embodiment of the ingredient manifold.

Another embodiment of the ingredient manifold 200 is shown in FIG. 3B. Similar to the previous embodiment, the ingredient manifold 200 is made up of a number of thermoplastic layers with milled channels that are appropriately sealed off. In one embodiment, the layers are held together by screws. In another embodiment, the layers are held together by a suitable adhesive material. In a different embodiment, the layers are heat sealed. It should be understood that the ingredient manifold 200 is not limited to being a layered device, but could be a single monolithic piece. Indeed, in another embodiment, the ingredient manifold 200 could also be made up of any suitable number of layers. In addition, the layer material is not meant to be limited to thermoplastic, but could be a number of suitable materials, for example, a metal or ceramic.

Similar to the previous embodiment, ingredient solenoid valves 280 are also assembled on to the ingredient manifold 200, contributing to control ingredient flow into the fluidic chip 300 and waste flow outward from the fluidic chip 300. Incorporated on the ingredient manifold 200, solenoid valves 280 may be either in an open or closed state in communication with ingredient fill channels 220 which are connected with corresponding ingredient reservoirs 210 in the manifold 200. In one embodiment, when an appropriate solenoid valve 280 is opened, a selected ingredient from a respective ingredient reservoir 210 may flow into an ingredient fill channel 220 and subsequently into a main fill channel 222, where flow may continue on to metering chambers 510 within the fluidic chip 300 (See FIG. 7). In this case, there are three different ingredient reservoirs 210 that may each be selected to fill metering chambers in the fluidic chip 300. It should be appreciated that any number of ingredients may be incorporated into the ingredient manifold 200.

In this embodiment, the ingredient manifold also includes an overflow outlet 224. Excess ingredients that flow through and past the metering chambers exits the overflow outlet 224 and flows into a separate overflow container 215. As with the previous embodiment, when the fluidic chip 300 is washed, waste may flow through the main fill channel 222 line backwards from the fluidic chip 300 into a waste channel 226, through a waste valve 227, and eventually into a waste container 225. The main difference between this embodiment and the previous embodiment is that the overflow and waste materials are distributed to separate containers 215 and 225 in this embodiment, shown in FIG. 3B, whereas the overflow and waste materials are flowed in a common container 216, shown in FIG. 3A.

Also in this embodiment, purge channel 228 supplies pressurized air and/or water (or other suitable fluid) to push ingredients through the different channels associated with the device. Another solenoid valve that provides for three way switching may be used to switch purge ingredients between air and water.

It should be appreciated that the present invention should not be limited in this respect to the present embodiments. For example, in another embodiment, waste back from the fluidic chip 300 does not flow back through the main fill channel 222, but through a separate line. In another embodiment, a separate wash line from the rest of the device is connected to the main fill channel 222. In another embodiment, the overflow outlet 224 may be connected with the waste channel 226. It should be understood that the channels that supply ingredients and purge materials as well as channels that bring overflow and waste materials out may be designed to communicate with the fluidic chip 300 in any suitable manner.

As mentioned, several control modules 400, shown in FIGS. 2A and 2B, serve to actuate the different valves in the device 10, typically through pressure management. In one embodiment of a control module 400, a control module thick layer 410 is coupled to a control module thin layer 420. A control module thick layer 410 may be a thermoplastic piece attached to a control module thin layer 420 which can be a thinner thermoplastic that functions as a suitable complement to the thick layer 420. In one embodiment, the control module thick layer 410 and thin layer 420 are held together by screws. In another embodiment, the control module thick layer 410 and thin layer 420 are held together by a suitable adhesive material. In a different embodiment, the control module thick layer 410 and thin layer 420 are heat sealed together. It should be understood that a control module 400 is not limited to being a layered device, but could be a single monolithic piece. Indeed, in another embodiment, a control module 400 could also be made up of any suitable number of layers. In addition, the layer material is not meant to be limited to thermoplastic, but could be a number of suitable materials, for example, a metal or ceramic.

Figure 4A:
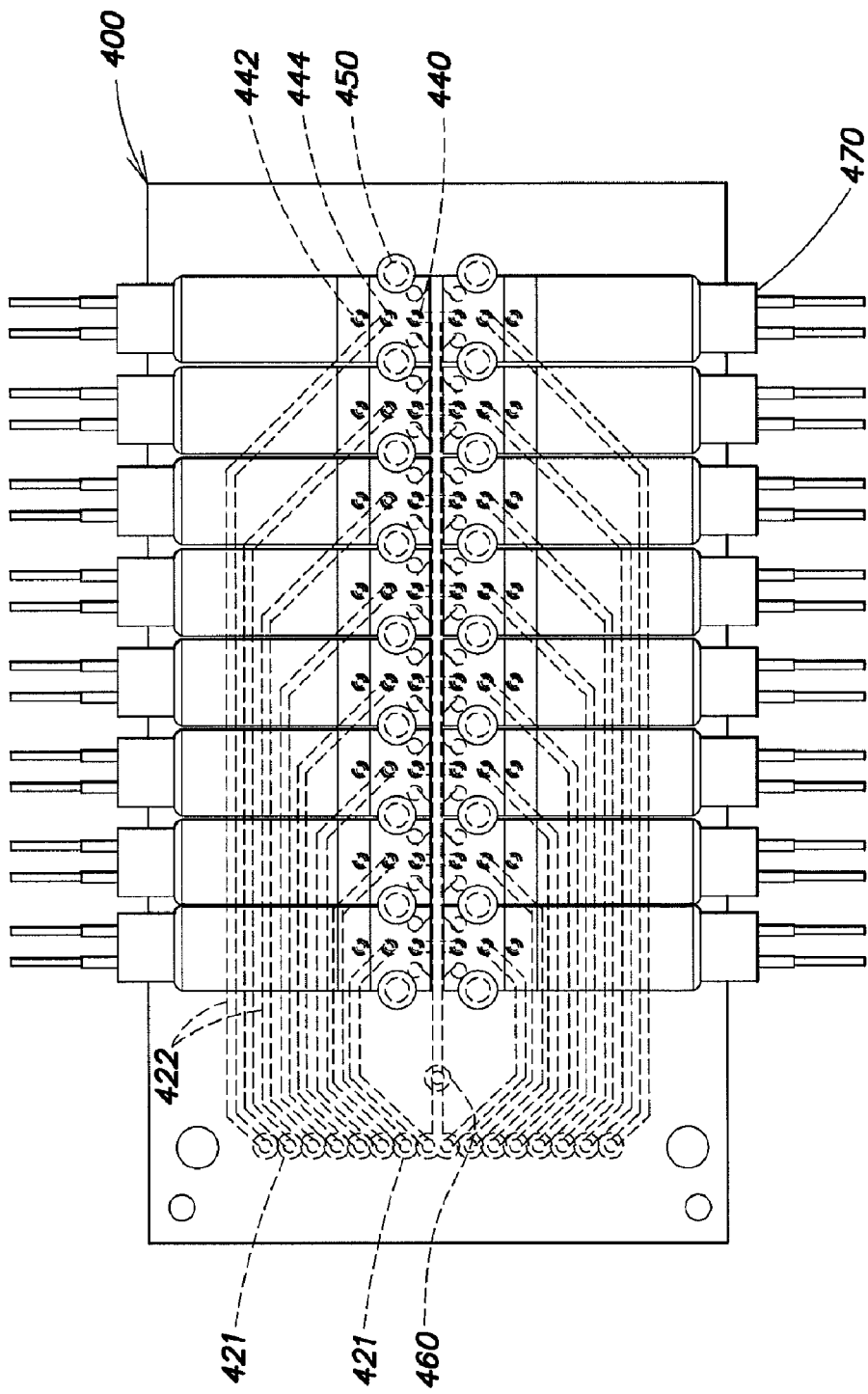
FIG. 4A is a top view of one embodiment of a control module.

One control module 400 is shown in FIG. 4A. The control module 400 may incorporate outlets 421 to connect control channels 422 that are routed to the manifold collector 100 and then to the fluidic chip 300. Each of the control channels 422 eventually communicate with valves, shown in FIG. 8B, such as at least one fill valve 640.

Figure 4B:
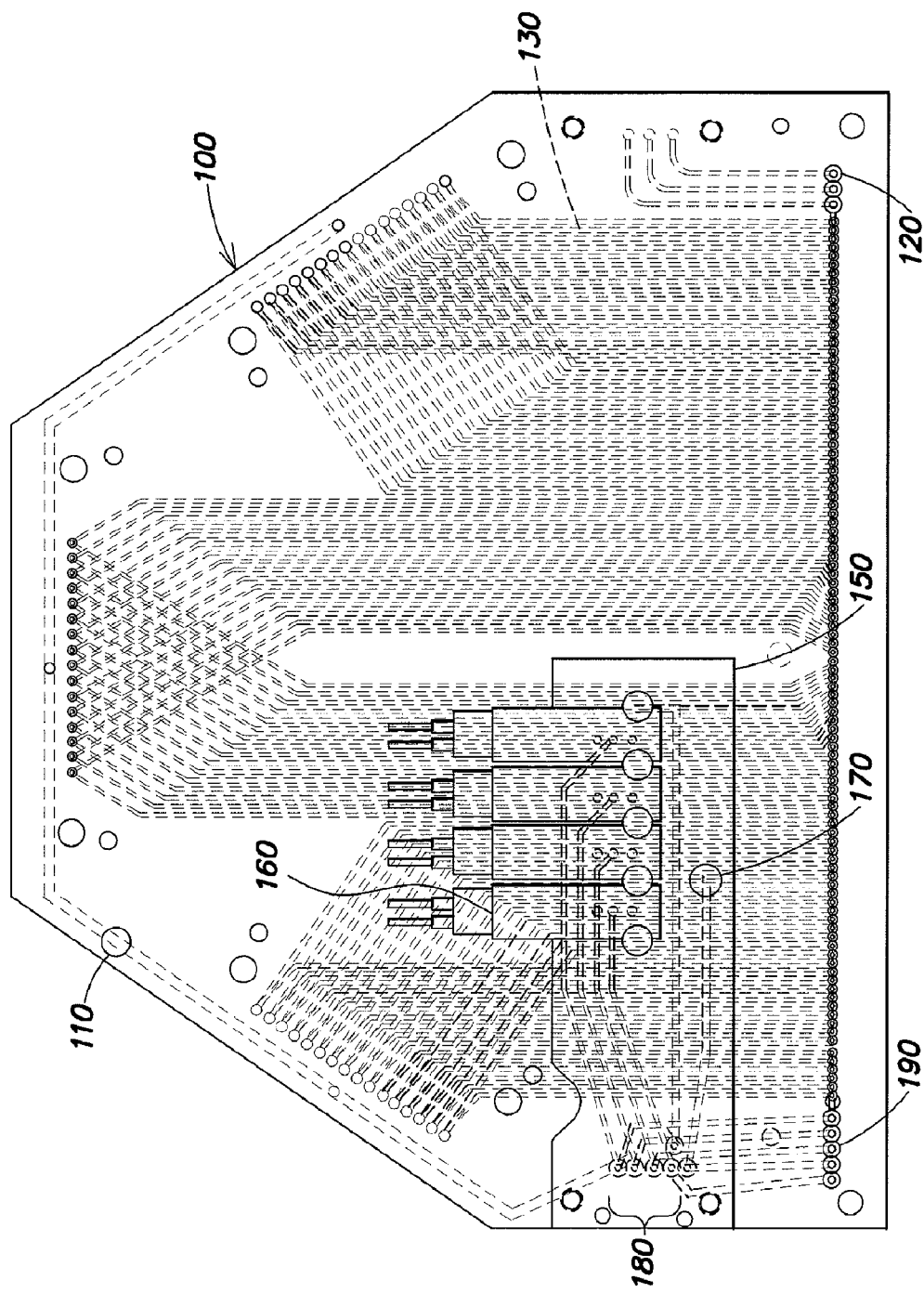
FIG. 4B is a top view of the manifold collector and shared control module.

As mentioned, in the embodiment of FIGS. 2A and 2B, the device includes a collector manifold 100 and a shared control manifold 150. FIG. 4B shows embodiments of the manifold collector 100 and the shared control manifold 150. The manifold collector 100 includes a pressure supply inlet 110 that allows for pressure distribution to the neighboring control modules 400. Ingredient channels 120 serve as conduits for ingredients to be supplied from the ingredient manifold 200 to the fluidic chip 300. Collector control channels 130 also run through the manifold collector 100 serving as conduits for control lines from the control modules 400 to reach the fluidic chip 300.

As mentioned above, air pressure is controlled by the opening and closing of control solenoid valves 470, shown in FIG. 4A, on a control module 400 which then gets routed to the fluidic chip 300. In one embodiment of a control module 400, a first valve input port 440 supplies control pressure. Control pressure may be in the range of 20-30 PSI, and in one embodiment, is approximately 25 PSI. In another embodiment of a control module 400, a second valve input port 442 may be open to atmospheric pressure conditions. In another embodiment, the second valve input port 442 may be in communication with a vacuum source. Valve outlet ports 444 may connect the corresponding control channel 422 to either the first valve input port 440 or the second valve input port 442.

In one embodiment, a control pressure supply port 460 connects externally generated and regulated pressure from the manifold collector 100 to the module. It should be understood that the control modules 400 may be designed in other ways; for example, it is possible to design the control modules 400 to incorporate at least two pressure supply ports. In other embodiments, each valve may correspond to a respective pressure supply port. Indeed, the present embodiment is not to be limited in this manner.

In one embodiment, screw holes 450 are provided to aid in mounting valves to the control modules 400. In another embodiment, an adhesive is provided to aid in mounting valves to the control modules 400.

Figure 4C:
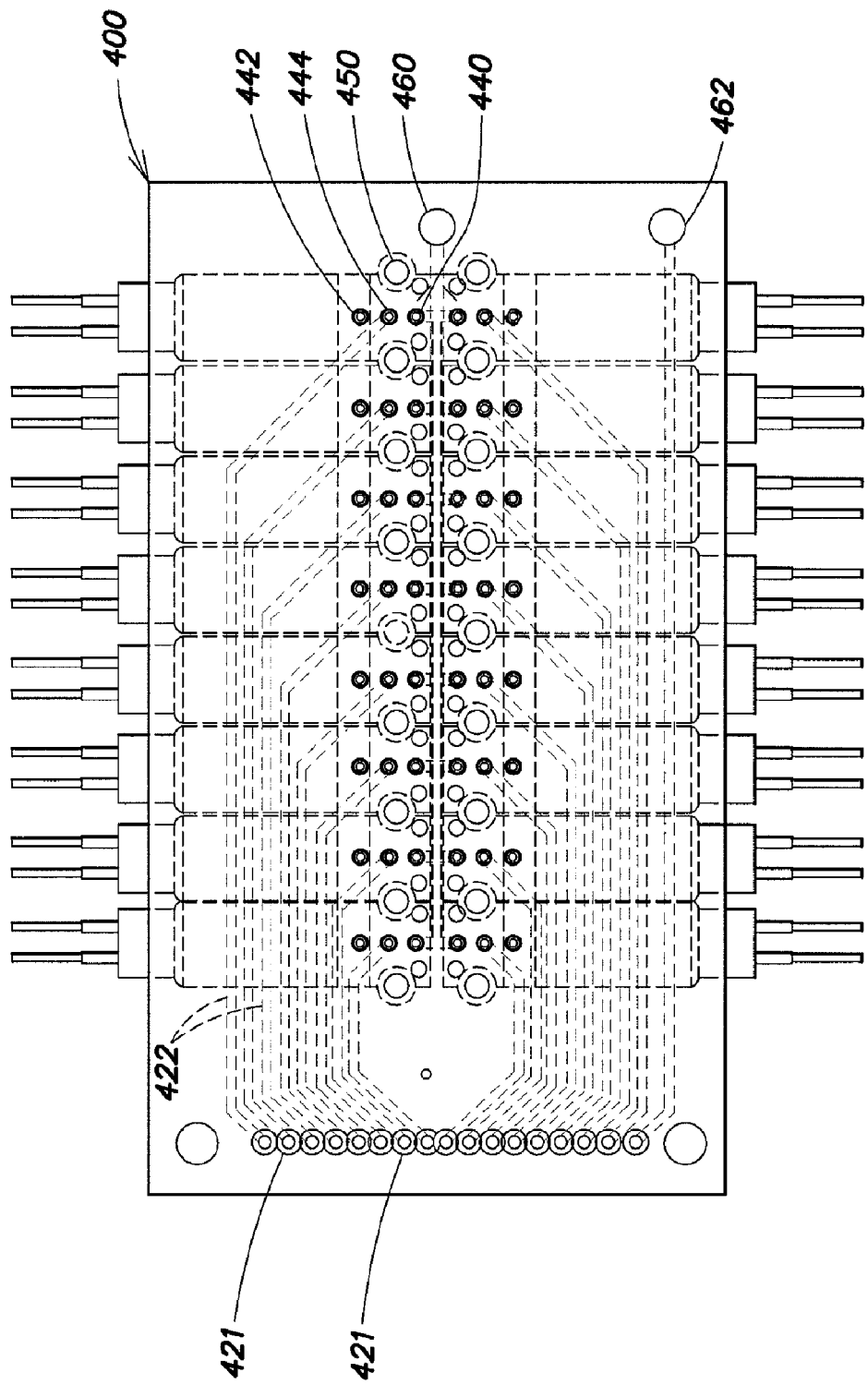
FIG. 4C is a top view of another embodiment of a control module.

In another embodiment of the present invention, a single control module 400, shown in FIG. 4C, functions to actuate all of the control valves in the device 10, including the shared control valves. In this embodiment, the control module 400 is manufactured similarly to the modules described above and is similarly not limited to the specific embodiments described. The control module 400 may incorporate outlets 421 to connect control channels 422 that are routed directly to the fluidic chip 300. In order to minimize excessive ingredient waste, overflow valve pressure may be controlled differently than for the other valves. In one embodiment, a module overflow pressure supply port 462 controls pressure to overflow valves 650, shown in FIG. 8B, for enhanced fill rate control. In this respect, all valves except the overflow receive the same control pressure. A control pressure supply port 460 connects externally generated and regulated pressure directly to the module. The main difference between this embodiment and that shown in FIGS. 4A and 4B is that this embodiment incorporates solenoid valves that are shared on the fluidic chip (i.e., purge and different size outlet volumes), the overflow pressure supply port, and the control pressure supply port directly on the module. In the embodiment depicted in FIGS. 4A and 4B, these mentioned features are located on other parts of the overall device, namely the manifold collector 100 and the shared control module 150. It should be understood that the control module 400 may be designed in other ways; for example, it is possible to design the control module 400 to incorporate at least two pressure supply ports. In other embodiments, each valve may correspond to a respective pressure supply port. Indeed, the present embodiment is not to be limited in this manner.

It is also possible in other embodiments for control channels 422 to communicate with other sets of valves shown in FIG. 8B, for example a particular size volume output valve, purge valve 660, or overflow valve 650. It should be appreciated that in some embodiments, control modules 400 may be designed in such a way that each of the control channels 422 could separately control a separately individual valve on the fluidic chip 300. In other embodiments, control modules 400 may be designed in such a way that each of the control channels 422 could control all of the valves on the fluidic chip 300 commonly together. In one embodiment, control channels 422 are designed to control each of the fill valves 640 on the fluidic chip 300 separately individually. In another embodiment, control channels 422 are designed to control all of the valves on the fluidic chip 300 corresponding to one particular discrete output volume commonly. Indeed, it should be understood that the embodiments presented herein are not limiting, but that the control channels 422 may be designed in any combination of desired valve control on the fluidic chip 300 as desired.

Although in the embodiments described, the valves are actuated through the application of pressure, the present invention is not limited in this regard. Thus, in another embodiment, the valves are actuated through electrical switching means. In another embodiment, valves are actuated through mechanical switching.

Figure 5:
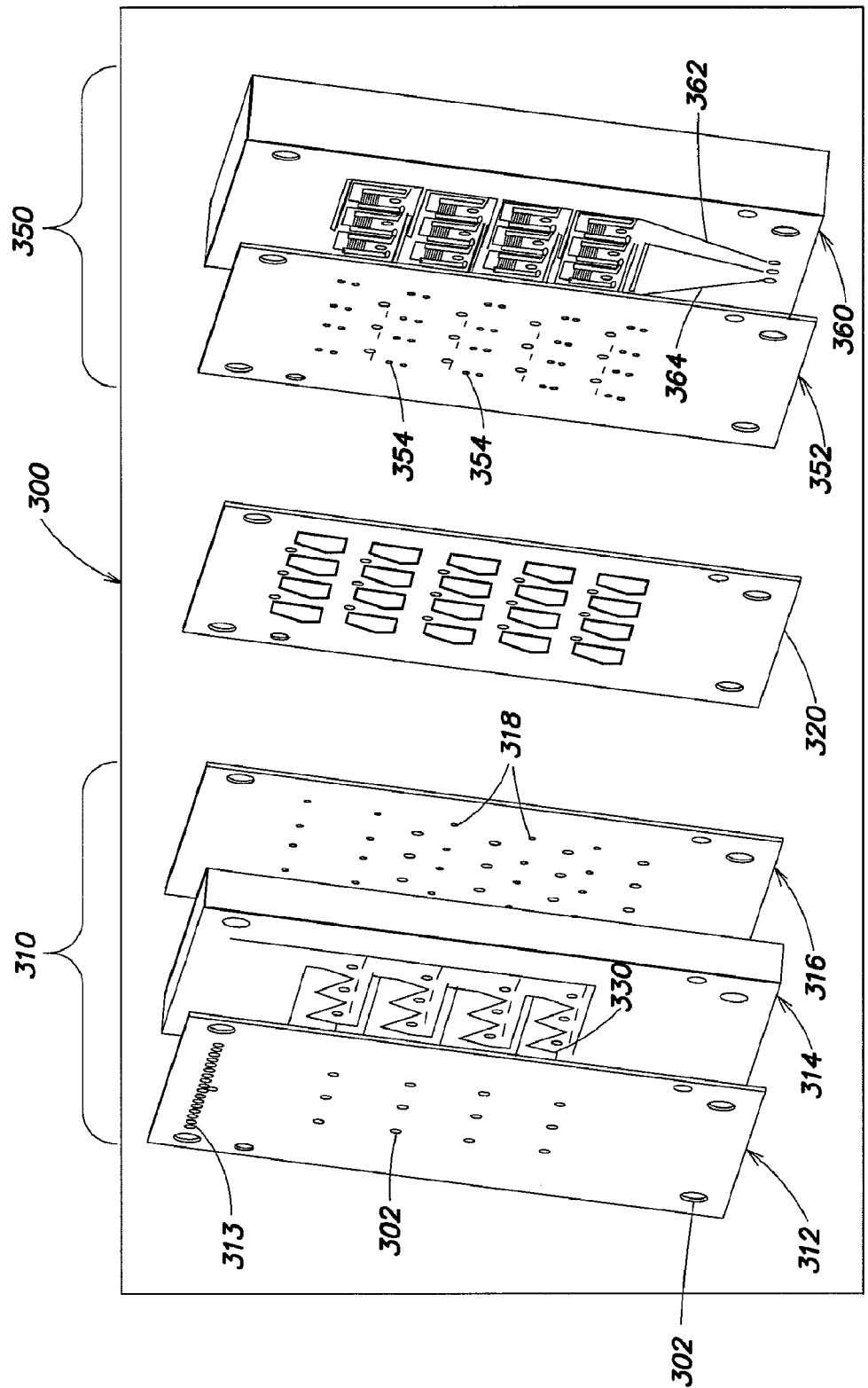
FIG. 5 is a perspective view of layers forming one embodiment of the metering assembly.

As mentioned above, one or more metering assemblies are incorporated into a fluidic chip 300, as shown in the exploded view in FIG. 5. The fluidic chip 300 measures and dispenses designated ingredients to designated output wells. In one embodiment, the fluidic chip 300 is made up of two main layers: a control layer 310, and a fluid layer 350. The control layer 310 may be constructed of a control thin top layer 312, a control thick layer 314, and a control thin bottom layer 316. In one embodiment, the control thin top layer 312 may have control holes 313 that interface with the control modules 400. Portions of the control thin top layer 312 appropriately seal off control channels 330 that may be located in the top side of the control thick layer 314. In this manner, control channels 330 are sealed so that pressure can be properly distributed in a suitable way. The control channels 330 may be suitably etched in the control thick layer 314. Other suitable techniques for manufacturing channels in layer 314 may be employed, as the present invention is not limited in this respect. For example, the channels may be milled or molded in the layer. The control thin bottom layer 316 may also include control access holes 318 for control channels 330 and valves to be in communication. It should be understood that the fluidic chip 300 and the other layered modules are not limited to being a layered device, but could be a single monolithic piece and may be formed through suitable techniques such as molding or stereolithography techniques. Indeed, in another embodiment, the fluidic chip 300 could also be made up of any suitable number of layers.

In one embodiment of the fluidic chip 300, the layers in the control thick layer 310 are held together by screws which are placed through screw holes 302 that run through all of the layers. In another embodiment, the layers in the control thick layer 310 are held together by a suitable adhesive material. In one embodiment of the fluidic chip 300, the layers in the fluid layer 350 are held together by screws that run through screw holes 302. In another embodiment, the layers in the fluid layer 350 are held together by a suitable adhesive material. In a different embodiment, the layers are heat sealed together.

Fluid control channels 330, shown in FIG. 5, distribute pressure to particular valves in the fluidic chip 300 in a controlled manner according to a desired outcome, receiving pressure signals from the control channels 422 in the control modules 400 that are shown in FIG. 4. Fluid control channels 330 may be located in both upper and lower regions of the control layer 310 so that separate channels 330 do not interfere with one another. A spacer and valve layer 320 can also be incorporated in the fluidic chip 300 where valves and spacers are located and aligned in between the control layer 310 and the fluid layer 350. In this manner, a spacer and valve layer 320 ensures that the control and fluid layers are a suitable distance apart for optimal mechanical function for the chip 300.

In one embodiment, the fluid layer 350 may be made up of a fluid thin layer 352 and a fluid thick layer 360. The fluid thin layer 352 may have access through fluid access holes 354 located between liquid channels and valves to allow fluid access to the valves. In one embodiment, the fluid thin layer 352 is approximately 250 μm thick. In one embodiment, for every valve, one control access hole 318 corresponding to the control layer 310 and two fluid access holes 354 corresponding to the fluid layer 350 is provided. In this embodiment, the metering and dispensing occurs in the fluid thick layer 360. Similarly that to that described above for the control layer, suitable techniques for manufacturing channels in the fluid layer 350 may be employed, as the present invention is not limited in this respect. For example, the channels may be milled or molded in the layer.

Figure 6:
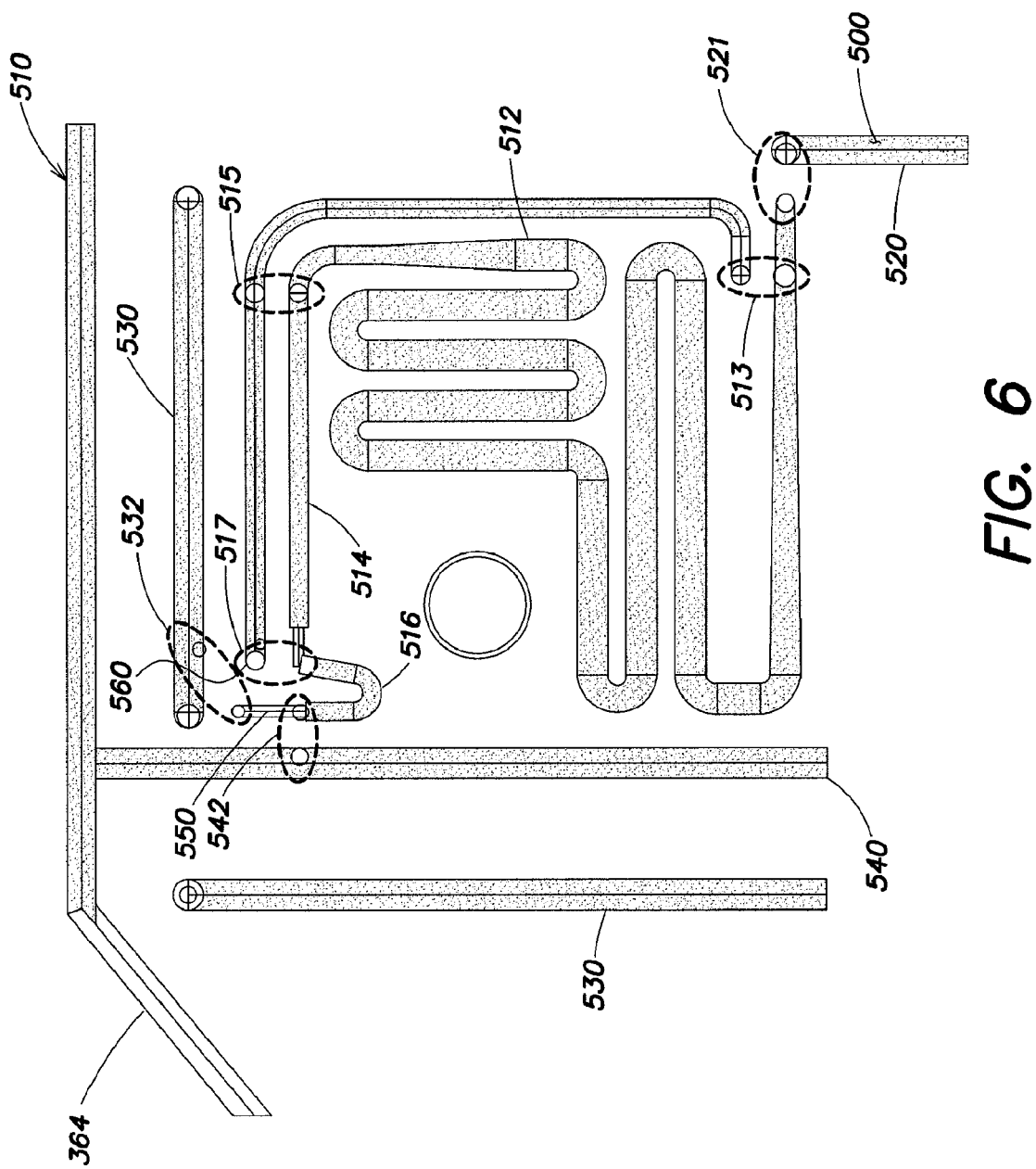
FIG. 6 is an enlarged top view of a metering chamber showing channels and valves.

FIG. 6 shows a metering chamber 510, a number of which are located in the fluid thick layer 360 with separate portions corresponding to a large channel portion 512, a medium channel portion 514, a small channel portion 516, a fill channel 520, an overflow channel 530, and a purge channel 540. One embodiment of a metering chamber 510, shown in FIG. 6, incorporates several features that allow quick and efficient ingredient separation and dispensing to occur therein. Here, ingredients 500 are flowed through from a source and through a dispensing chamber (rather than being aspirated in from a source through the same nozzle or region as the eventual exit outlet). Metering chamber 512 follows a tortuous path, allowing for more volume to be dispensed from a chamber given the overall space that it occupies. The tortuous chamber structure in the metering chamber 510 may also help to prevent bubble formation amidst the ingredients 500 within the chamber. In addition, portions of the metering chamber 510 may be shaped in any suitable manner to provide for accurate and desired dispense output. For example, in the embodiment shown in FIG. 6, the top down perspective illustrates the large channel portion 512 to be thicker than the medium channel portion 514 and the small channel portion 516. End regions of the large channel portion are shown to be tapered in order to provide a smooth transition between neighboring channel thicknesses.

As described above, the metering chamber 510 may be divided into three channel portions: a large channel portion 512, a medium channel portion 514, and a small channel portion 516. For each channel portion, a corresponding large volume transfer region 513, medium volume transfer region 515, and small volume transfer region 517 may also be incorporated. As mentioned above, it should be appreciated that the metering chamber 510 may be divided into any suitable number of channel portions. In one embodiment, the volume of the large channel portion 512 added together with the medium channel portion 514 and small channel portion 516 may range between approximately 1 µL and approximately 10 µL, the volume of the medium channel portion 514 added together with the small channel portion 516 may range between approximately 500 nL and approximately 1 µL, and the volume of the small channel portion 516 alone may range between approximately 50 nL and approximately 500 nL. It should be understood that a metering chamber 510 is not to be limited in the number of discrete volume outputs or the actual volumes that are outputted. It should be appreciated that it may also be suitable, but not limiting, for the channel thicknesses at each volume transfer region to be relatively uniform in order to provide for accurate dispensing.

In one embodiment, each metering chamber 510 also includes a fill channel 520 along with an associated fill transfer region 521 that provides the desired fill ingredient 500 access to that particular metering chamber 510. In this case, the fill ingredient originates from the ingredient manifold 200, is transferred from the main fill channel 222, shown in FIG. 3, to a common fill channel 362, shown in FIG. 7, and finally enters the fill channel 520. A fill valve 640, shown in FIG. 8B, corresponding to fill transfer region 521 may be actuated so that the desired ingredient 500 is able to flow through into the selected metering chamber 510, which includes the large channel 512, medium channel 514, and small channel 516 volume portions. In one aspect, a single fill line is routed to each metering chamber 510 through a corresponding fill channel 520, and the fill valve 640 for each metering chamber 510 is controlled separately. In this respect, each metering chamber 510 may be selectively filled with any ingredient from the ingredient manifold 200.

When the metering chamber 510 is completely filled, ingredient overflow will occur, which will flow into an overflow channel 530 through an overflow transfer region 532. In order to prevent excessive overflow, a restriction valve region 550 may be actuated so that the fill velocity into the metering chamber 510 is reduced. In one embodiment, a restriction tube is provided within the restriction valve region 550 which may be appropriately constricted, through pressure application or any suitable means, in order to reduce flow velocity. In this manner, reduced flow velocity may be controlled as desired. In another embodiment, a capillary structure is provided within the restriction valve region 550 without outside pressure application or other stimulus, reducing flow velocity without outside control.

When a dispense or wash of the metering chamber 510 is desired, purge contents may be flowed through a purge channel 540 through a purge transfer region 542, by actuating purge valve 660, shown in FIG. 8B, and into the metering chamber. If desired, fill channel 520 may also receive purge contents. When a dispense is required, the fill transfer region 521 is actuated so that no material is permitted to or from the fill channel 520, and air is used to push out the appropriate volume of contents from the metering chamber 510. In this case, the volume of the ingredient 500 to be dispensed is controlled by which transfer region is actuated to open while keeping the other valves closed. In this embodiment, a single metering chamber 510 can be used to measure out a variety of discrete output volumes. For example, if a large volume amount is to be dispensed, then the medium volume transfer region 515 and the small volume transfer region 517 are actuated to prevent flow through while the large volume transfer region 513 is actuated to allow flow through. If a medium volume amount is to be dispensed, then the large volume transfer region 513 and the small volume transfer region 517 are actuated to prevent flow through while the medium volume transfer region 515 is actuated to allow flow through. If a small volume amount is to be dispensed, then the medium volume transfer region 515 and the large volume transfer region 513 are actuated to prevent flow through while the small volume transfer region 517 is actuated to allow flow through. Once ingredients 500 are to be dispensed out of the metering chamber 510 purge transfer region 542 actuates and pressurized purge material pushes the selected ingredients 500 through the appropriate transfer region and out an outlet nozzle 560. In this respect, air is used as the motive force to push the ingredients out through the outlet nozzle 560. For clarity, it should be mentioned that air may be used either as a force to dispense or to purge, depending what the desired function may be. When a wash is required, the purge content is typically a combination of air and water and the contents of fill channel 520 are washed through. In this aspect, it is possible to selectively choose what volumes to eject out of each metering chamber 510 and then selectively repeat this process however many times as desired.

Figure 7:
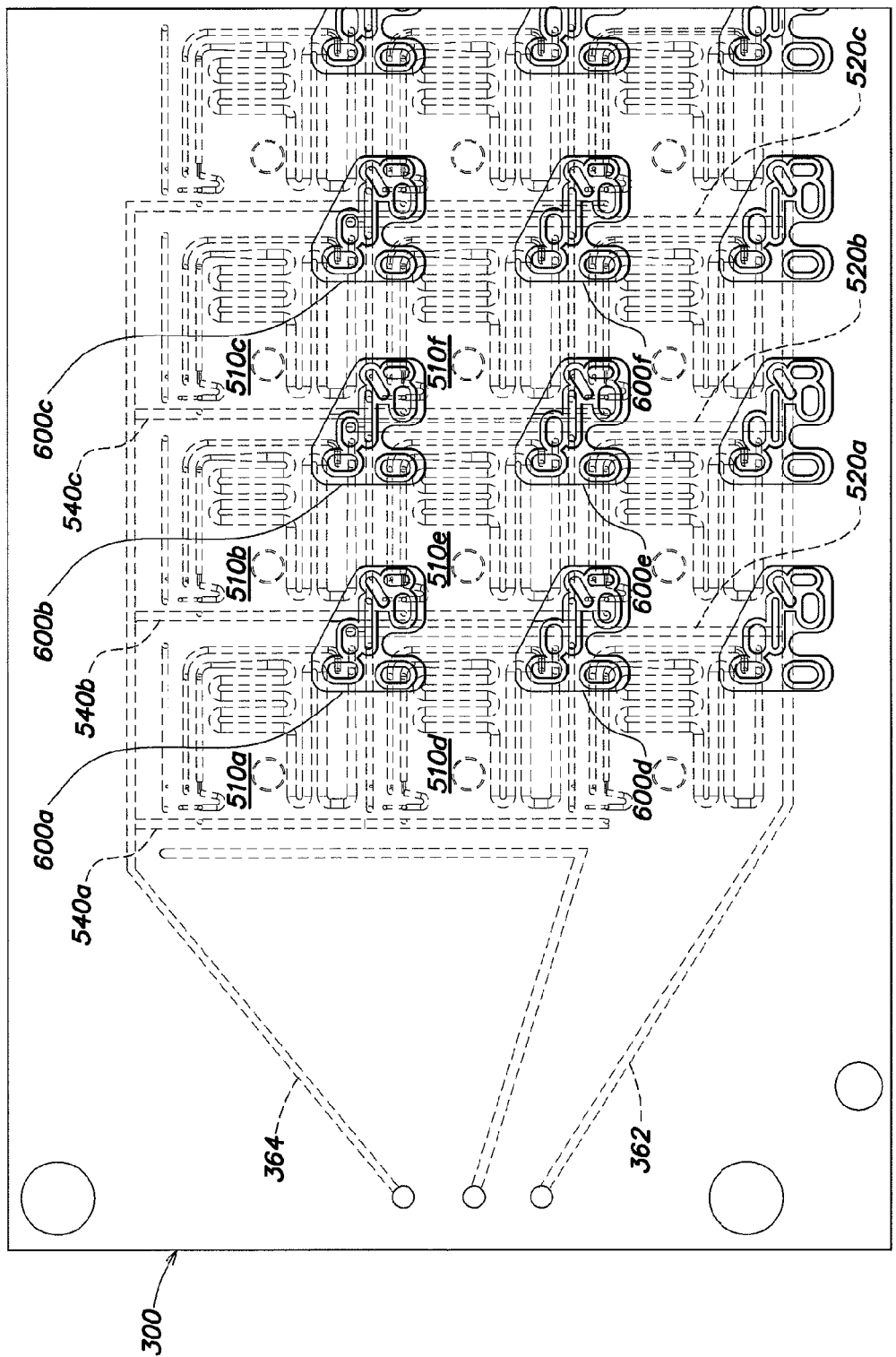
FIG. 7 is a top view of several metering chambers and valve clusters.

The process involved in filling, metering, and dispensing will be described in more detail later. More specific structural features of the fluidic chip 300 and how neighboring metering chambers and corresponding valves relate to one another will now be illustrated. In one embodiment, clusters of valves 600a, 600b, 600c, etc. may be placed in suitable locations corresponding respectively to neighboring metering chambers 510a, 510b, 510c, etc., as shown in FIG. 7. It can be seen in this embodiment that the fluid layer 350 includes a common fill channel 362 that fills several fill channels 520a, 520b, 520c, etc. and a common purge channel 364 that acts as a purge materials source for several purge channels 540a, 540b, 540c, etc. It should be appreciated that the present embodiment should not be limited in this manner. For example, in one embodiment, at least one common fill channel fills the several fill channels. In another embodiment at least two common fill channels fill separate groups of the several fill channels. In another embodiment, at least three common fill channels fill separate groups of the several fill channels. Indeed, it should be appreciated that any number of common fill channels could be used to fill any number of groups of fill channels.

Figure 8A:
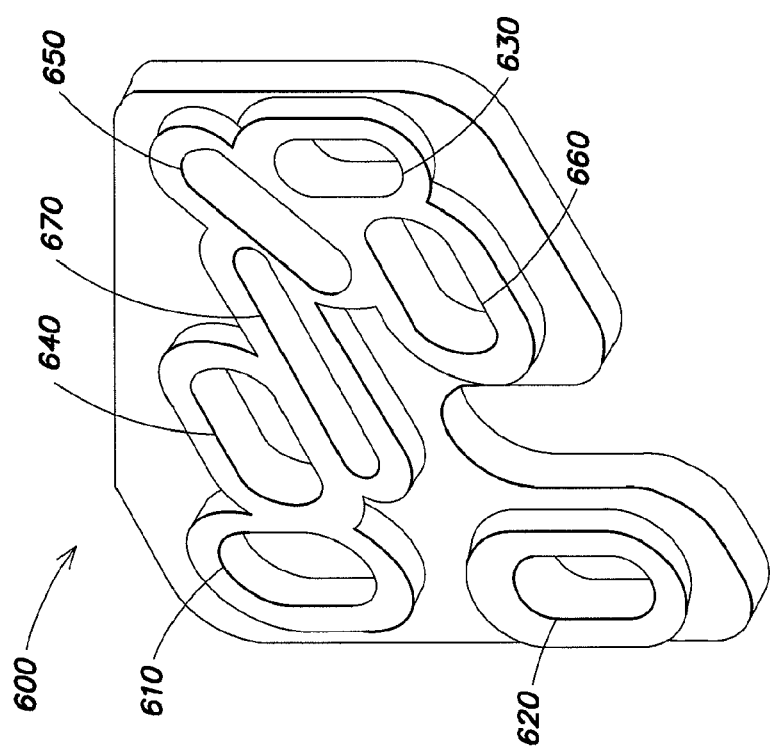
FIG. 8A is a perspective view of a valve cluster.

In one embodiment, the valves employed to control fluid flow may be clustered together on a single substrate. These valve clusters 600 may be suitably located so as to control a number of metering chambers 510 while taking up a minimal amount of space. One embodiment of a valve cluster 600 shown in FIGS. 8A and 8B is placed on a fluid layer 350 and allows for partial valve control of three separate metering chambers 510a, 510d, and 510e. In this embodiment, the valve cluster 600 has a large volume valve 610 and a fill valve 640 operable to control a large volume transfer region 513 and a fill transfer region 521 for metering chamber 510a. For metering chamber 510d, the position of the valve cluster 600 allows for control of a medium volume transfer region 515 through a medium volume valve 620. For metering chamber 510e, the position of the valve cluster 600 allows for control of a small volume transfer region 517 through a small volume valve 630, an overflow transfer region 532 through an overflow valve 650, and a purge transfer region 542 through a purge valve 660. In this embodiment, a bridge connection 670 is provided between overflow channels 530a and 530b to allow for overflow fluid to pass over while permitting fluid flow to occur simultaneously between one another in neighboring metering chambers 510. In one embodiment, no restriction of flow through the bridge connection 670 is provided. In another embodiment, a valve is provided at the bridge connection 670 for flow to be controlled. It should be appreciated that the manner in which valves are clustered for a valve cluster 600 is not limited to this embodiment. In addition, there is no limitation to be placed on the number valves that are located on a valve cluster 600. In one embodiment, each valve cluster holds only one valve. In another embodiment, all valves are located on a single valve cluster. Indeed, it should be understood that valves may be clustered in any suitable manner so as to save space and manufacturing costs.

Figure 9A:
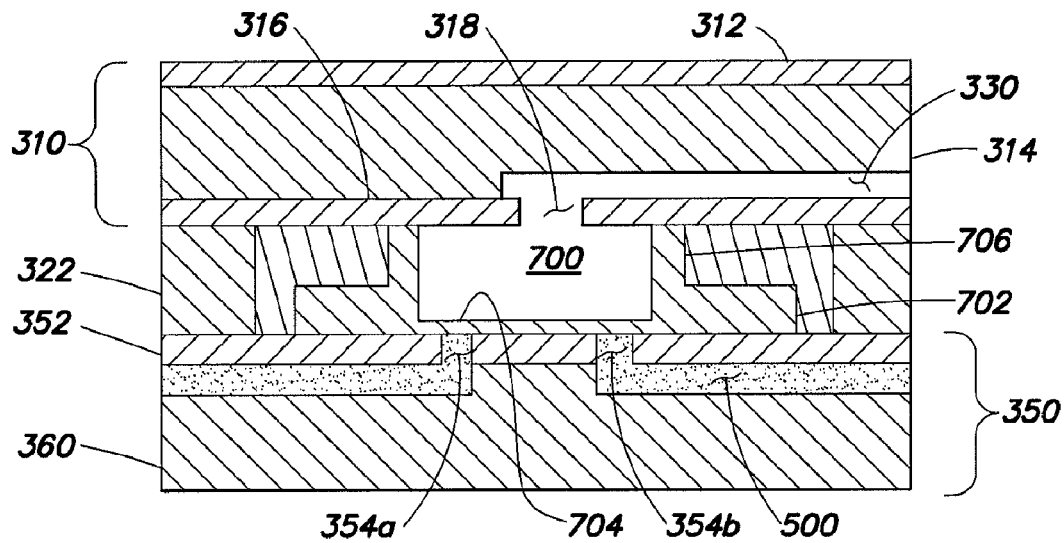
FIG. 9A is a schematic representation of a side view of an individual valve in a closed configuration.
Figure 9B:
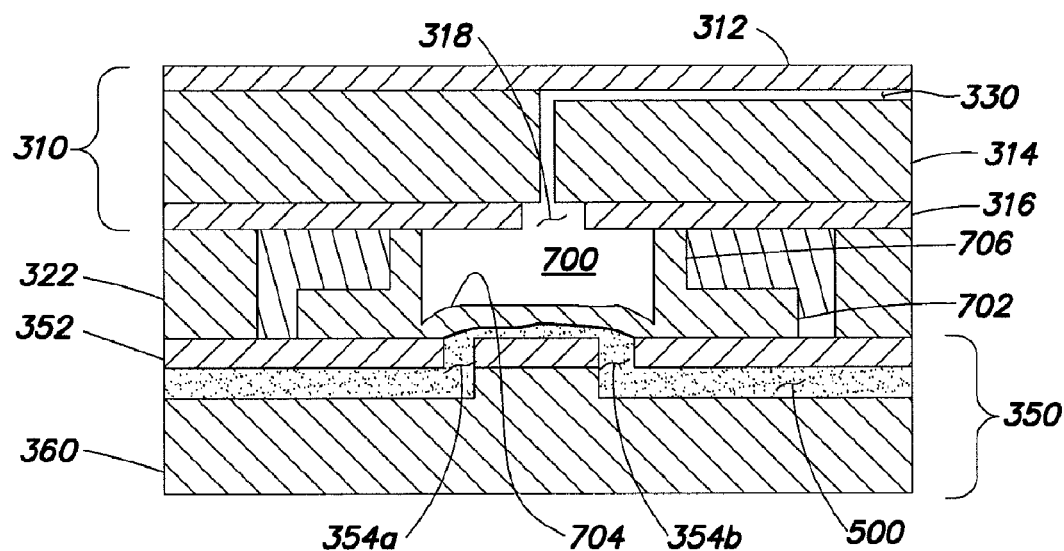
FIG. 9B is a schematic representation of a side view of an individual valve in an open configuration.

The valves can be controlled in a variety of suitable ways. In one embodiment, shown in FIGS. 9A and 9B, is actuated through a single control channel 330 inlet by the application of pressure. In FIG. 9A, the valve 700 is shown in a closed state as pressure is applied through the control channel 330 that runs through a control thick layer 314 and has access through a port access hole in a control thin bottom layer 316. In FIG. 9B, the valve 700 is shown in an open state as ingredient is permitted to pass in the fluid layer 350 from one fluid access hole 354a to another fluid access hole 354b. In this case, the pressure applied from the control channel 330 is not sufficient to prevent ingredient access from one inlet to another in the fluid layer 350. In another embodiment, a vacuum is applied through control channel 330, allowing for greater flow of ingredient from one inlet to another.

In one embodiment, the valve 700 is disposed between the control layer 310 and the fluid layer 350, serving as a conduit for communication to occur between the two layers. The valve is constructed as a multi-level molded silicone valve 700 and includes a base 702, a valve membrane 704, and a valve lip 706. The base 702 provides a surface for compression against a fluid thin layer 352, making an airtight seal supported by spacers 322. In one embodiment, spacers 322 are slightly shorter than the valve lip 706. Spacers 322 are located in the spacer and valve layer 320, shown in FIG. 5, between the control thin bottom layer 316 and the fluid thin layer 352. In one embodiment, the base 702 is thicker than the membrane 704. The added thickness may aid in preventing the valve membrane 704 from stretching and skewing. In one embodiment, the base 702 may be approximately 300 μm thick.

In a closed state, valve membrane 704 prevents a fluid ingredient 500 from passing through from one fluid access hole 354a to another fluid access hole 354b when sufficient pressure to close the membrane is applied through the control channel 330, shown in FIG. 9A. By the same manner, in an open state, valve membrane 704 allows for a fluid ingredient 500 to pass through from one fluid access hole 354a to another fluid access hole 354b when the pressure to close the membrane is not great enough, as shown in FIG. 9B. In one embodiment, the valve membrane 704 may be approximately 100 μm thick.

Valve lip 706 may provide added stability once pressure is applied to the system. The valve lip extends upward from the valve membrane and in one embodiment is about 200 μm tall above the base 702. The relatively large height as compared to the valve membrane thickness may also compensate for variances in tolerance between the layers of the fluid chip. In this manner, when the device is assembled and the layers are brought together, any fluctuation in layer thickness (or even lip height itself) is accommodated due to the amount the lip can deflect due to its relatively tall height.

In operation, one embodiment of the process of filling, supplying purge materials, metering and dispensing discrete output volumes, and washing as it occurs in the fluidic chip 300 is shown in FIGS. 10A-10F for the small, medium, and large dispenses and will now be described.

Figure 10A:
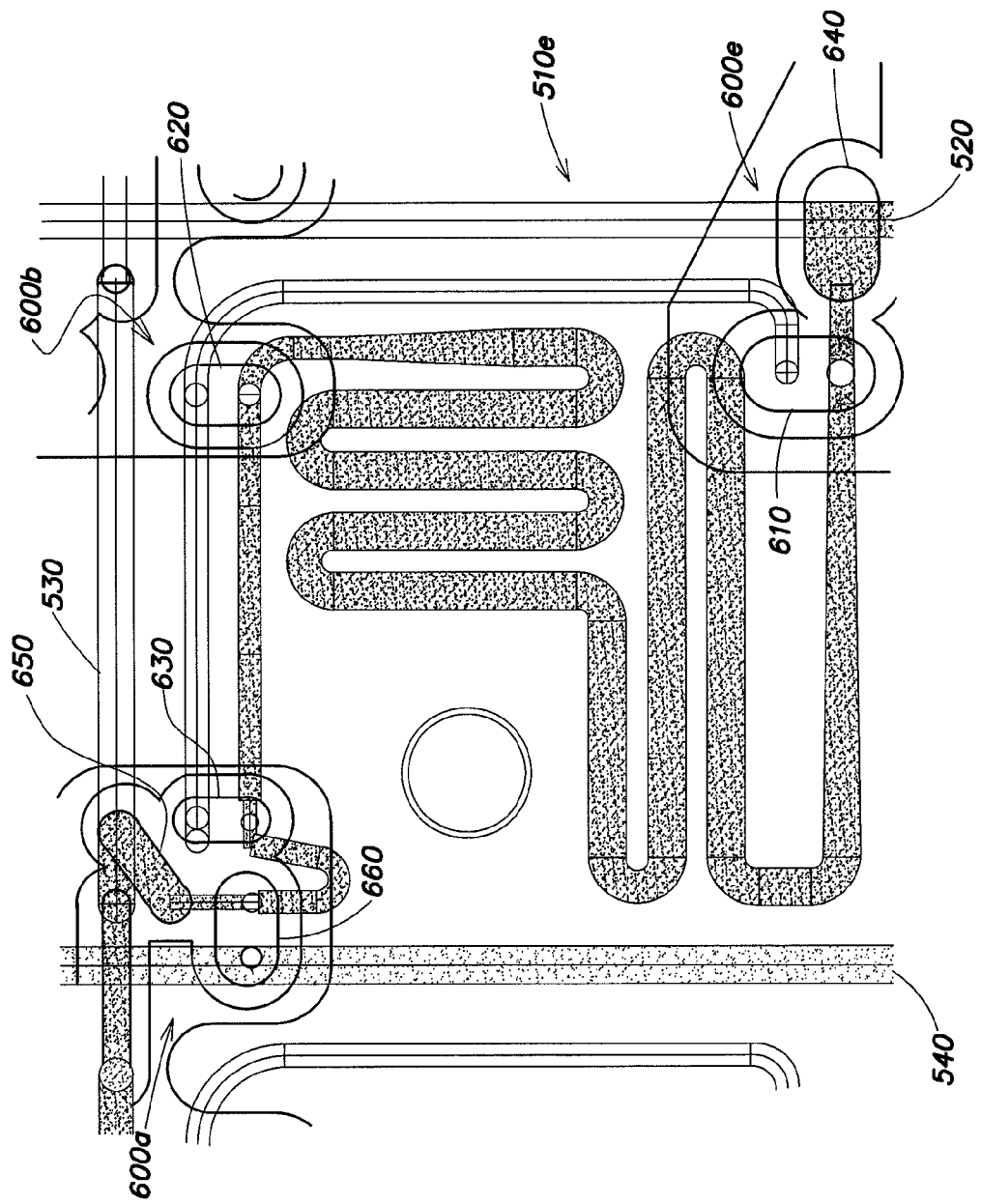
FIG. 10A depicts one embodiment of a process of filling a metering chamber.
Figure 10B:
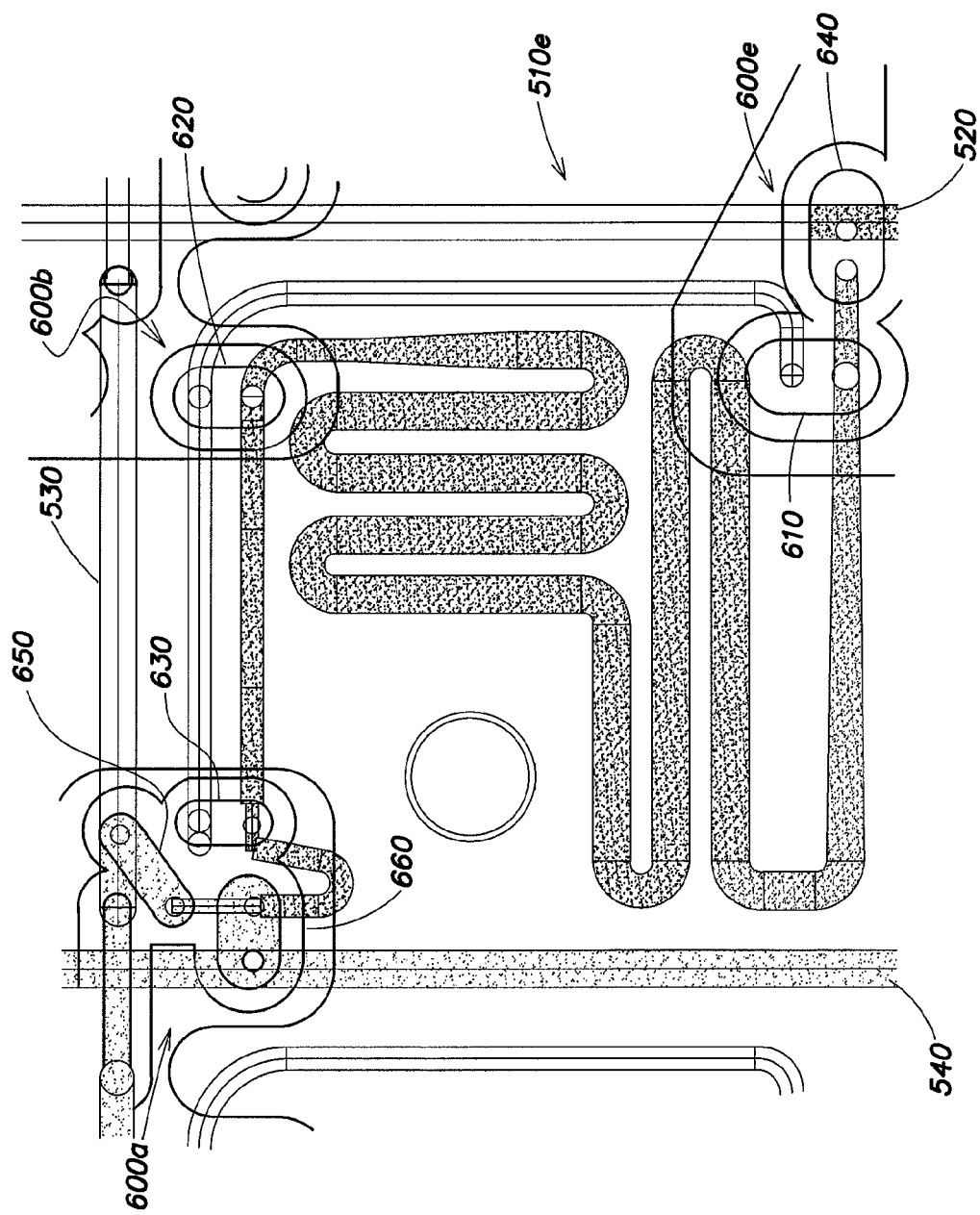
FIG. 10B depicts one embodiment of a process of beginning to dispense from a metering chamber.
Figure 10C:
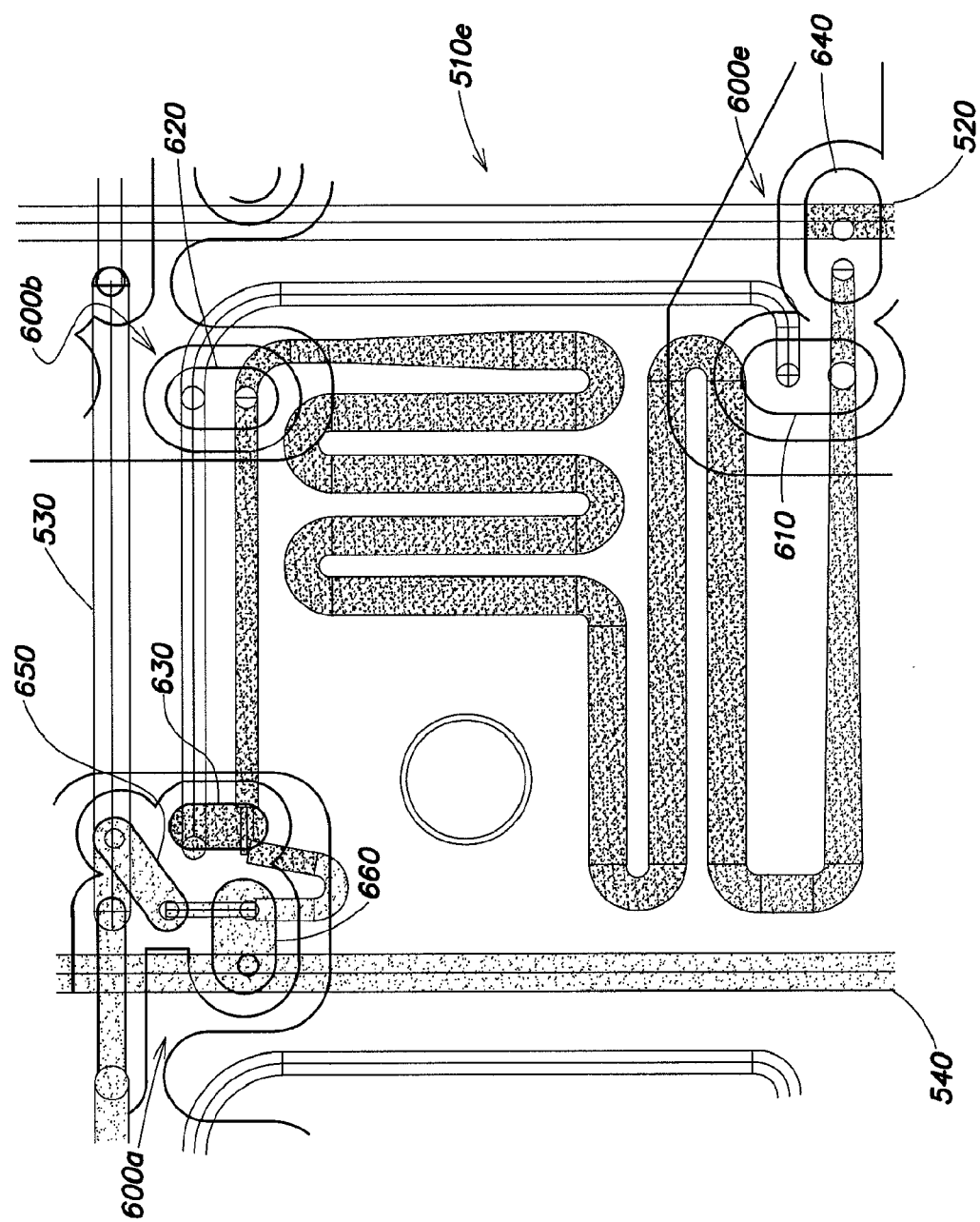
FIG. 10C depicts one embodiment of a process of metering and dispensing a small volume output.
Figure 10D:
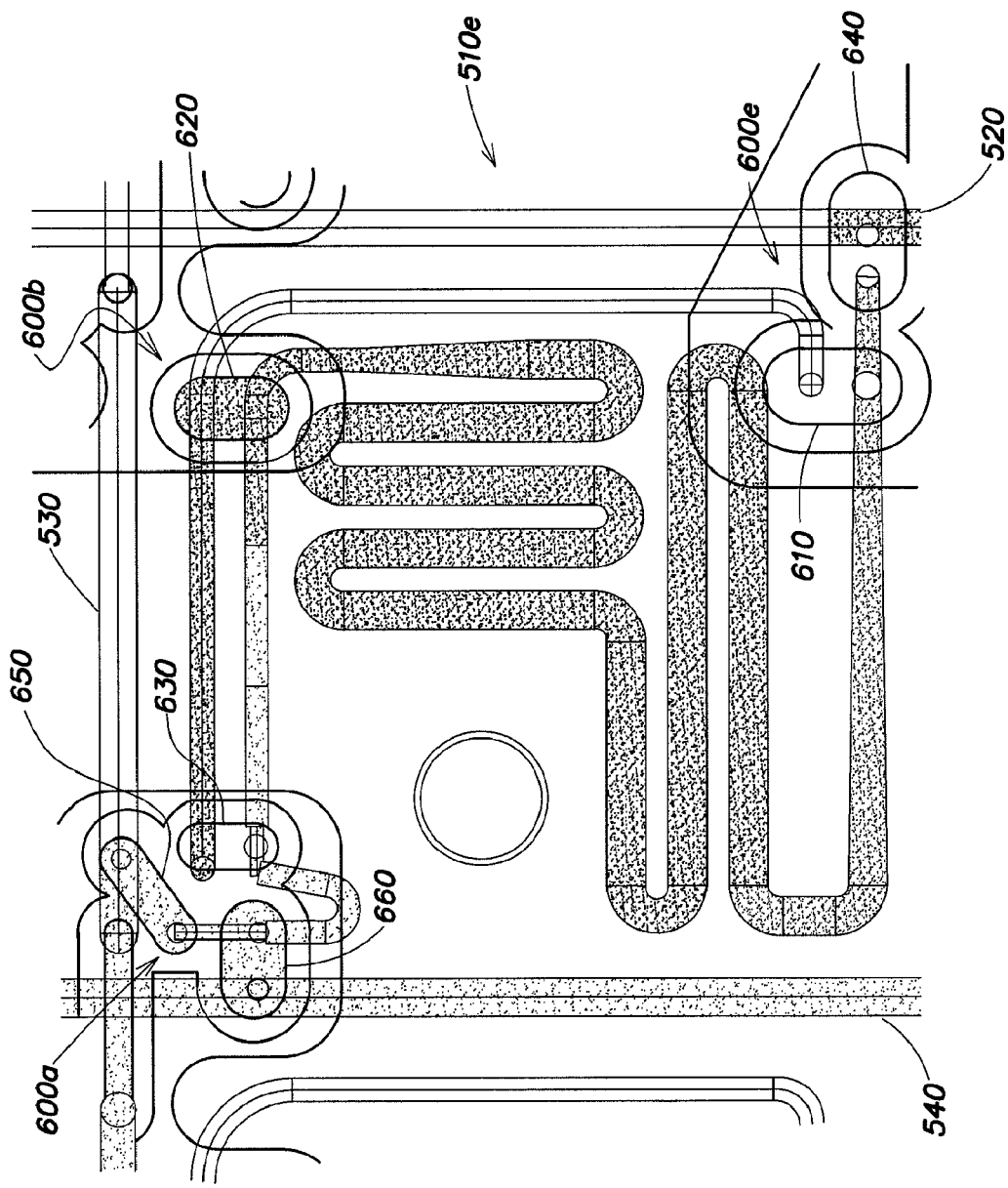
FIG. 10D depicts one embodiment of a process of metering and dispensing a medium volume output.
Figure 10E:
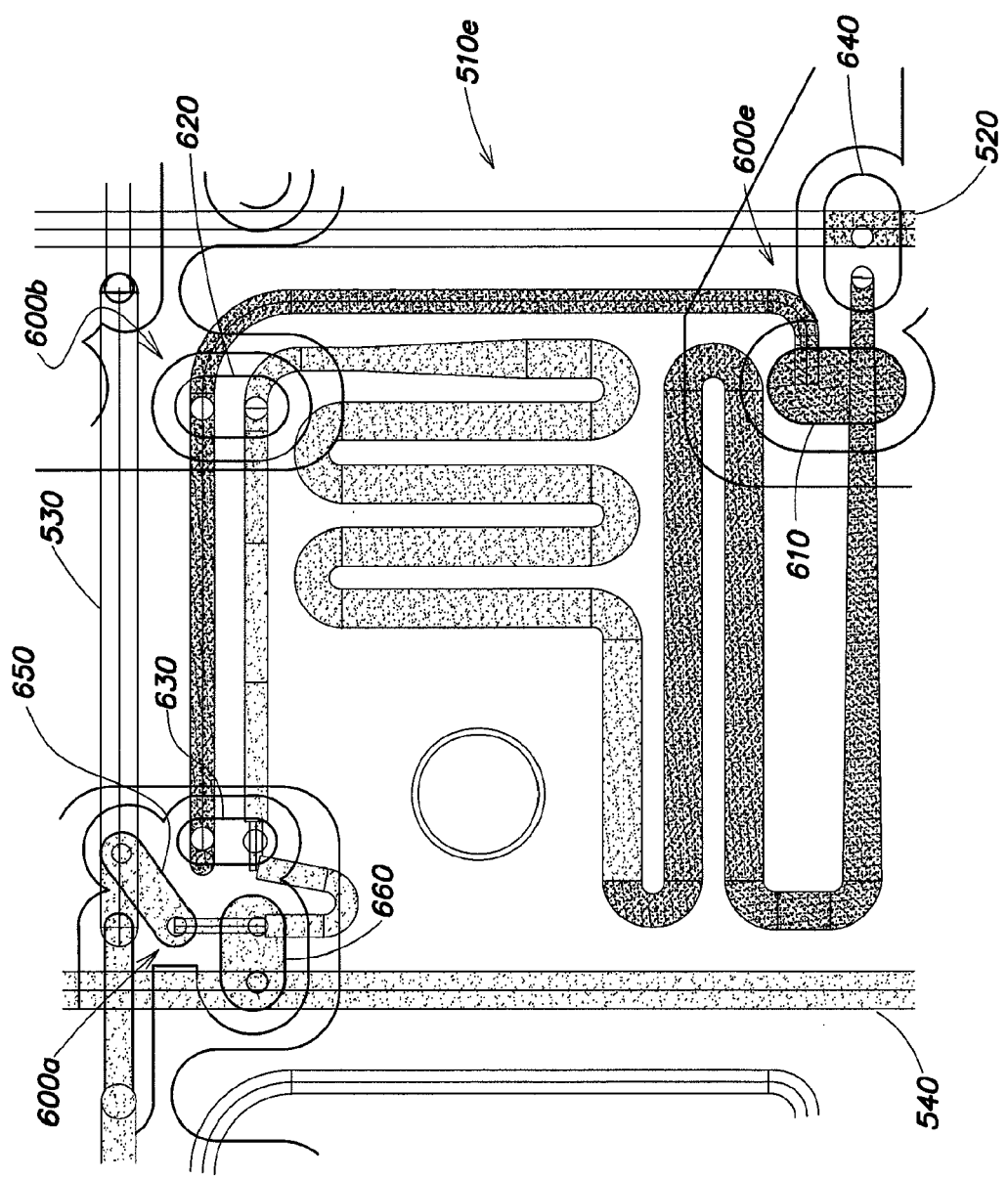
FIG. 10E depicts one embodiment of a process of metering and dispensing a large volume output.
Figure 10F:
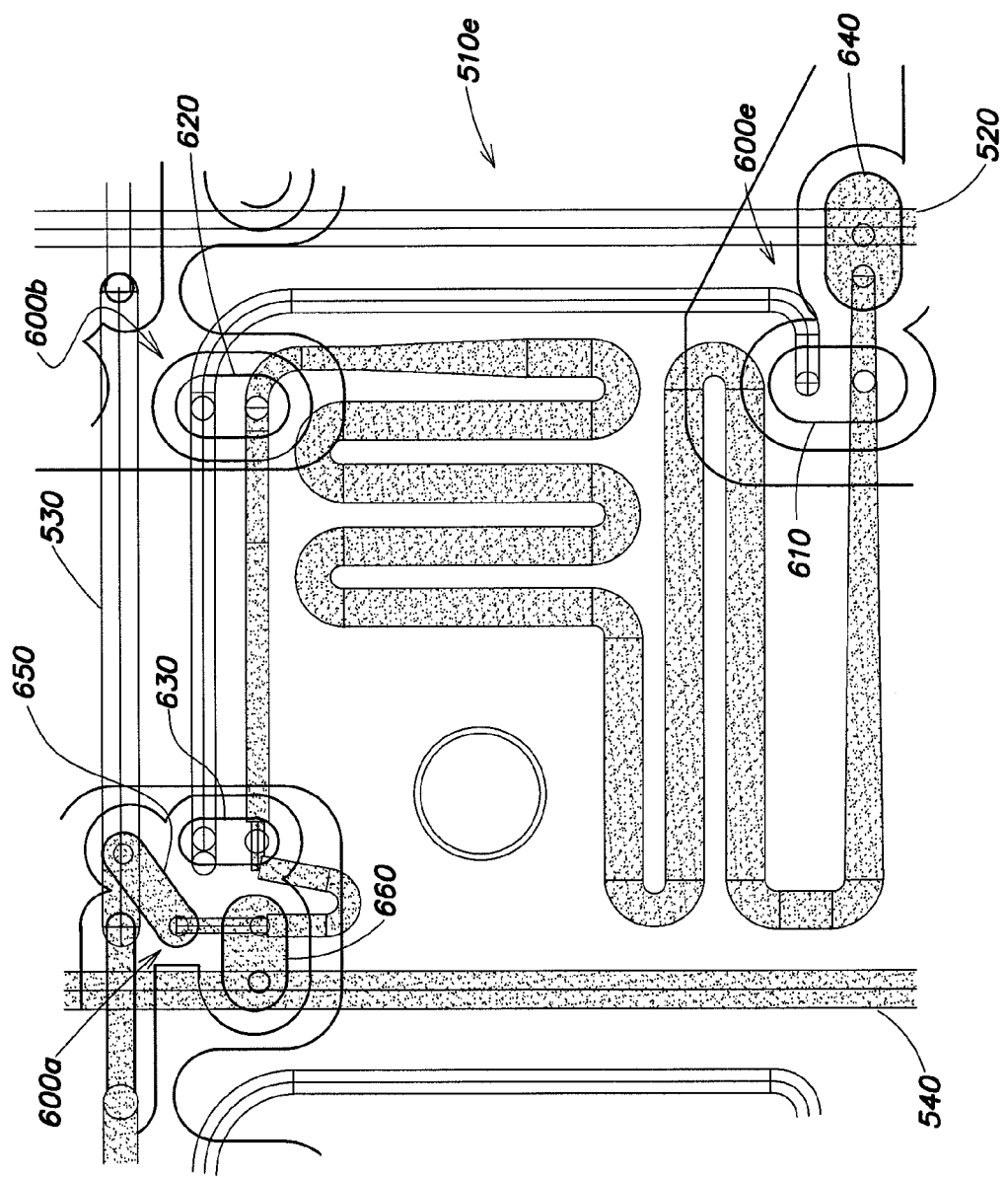
FIG. 10F depicts one embodiment of a process of washing a metering chamber.

In describing the process illustrated in FIGS. 10A-10F, reference will be made from FIG. 7 to metering chamber 510e which is in communication with valves corresponding to cluster valves 600a, 600b, and 600e. In this case, FIGS. 10A-10F depict an exploded view of metering chamber 510e as shown in FIG. 7. An ingredient manifold 200 supplies an ingredient to a fill channel 520 in the metering chamber 510e. As shown in FIG. 10A, fill valve 640 of cluster valve 600e. is opened, and the contents from the fill channel 520 are delivered to the metering chamber 510e. In the process of filling, the large volume valve 610 of cluster valve 600e, the medium volume valve 620 of cluster valve 600b, the small volume valve 630 of cluster valve 600a, and the purge valve 660 of cluster valve 600a are closed. The overflow valve 650 of cluster valve 600a is left open for extraneous ingredients to spill into the overflow channel 530. Once the metering chamber 510e is completely filled, the fill valve 640 is closed and the purge valve 660 is then opened for purge material, which is air in this case, to run through the purge channel 540 and push extra overflow into the overflow channel 530 as shown in FIG. 10B. At this point, the fill valve 640, the large volume valve 610, the medium volume valve 620, and the small volume valve 630 are all closed. Now, the metering chamber 510e is full of the desired ingredient and the metering chamber is ready to dispense the desired output volume. In this case, the purge valve 660 remains open so that air pressure is able to push the contents out from the metering chamber 510e in the desired volume, depending on which volume output valve is opened. If a small output volume is desired, then the appropriate small volume valve 630 is opened with the medium volume valve 620 and the large volume valve 610 both closed as shown in FIG. 10C. If a medium output volume is desired, then the appropriate medium volume valve 620 is opened with the small volume valve 630 and the large volume valve 610 both closed as shown in FIG. 10D. If a large output volume is desired, then the appropriate large volume valve 610 is opened with the small volume valve 630 and the medium volume valve 620 both closed as shown in FIG. 10E. Throughout these dispenses, the purge valve 660 and the overflow valve 650 remain open, and the fill valve 640 remains closed. Finally, once the desired ingredient has been dispensed and is ready to be washed completely from the metering chamber 510e, the purge valve 660 and the overflow valve 650 remain open, and the fill valve 640 also opens, as shown in FIG. 10F. In addition, the large volume valve 610, the medium volume valve 620, and the small volume valve 630 are all closed. As a result, purge material, which may be cycled between air and water, is subsequently flowed through the entire metering chamber and also through both the fill and overflow channels for a complete wash. The contents from the fill channel 520 and the overflow channel 530 are then directed through appropriate channels from the metering assembly and eventually to the ingredient manifold where overflow and waste materials are disposed of. The process may be repeated for another selected ingredient and for another or the same dispense volume, as desired.

Figure 11:
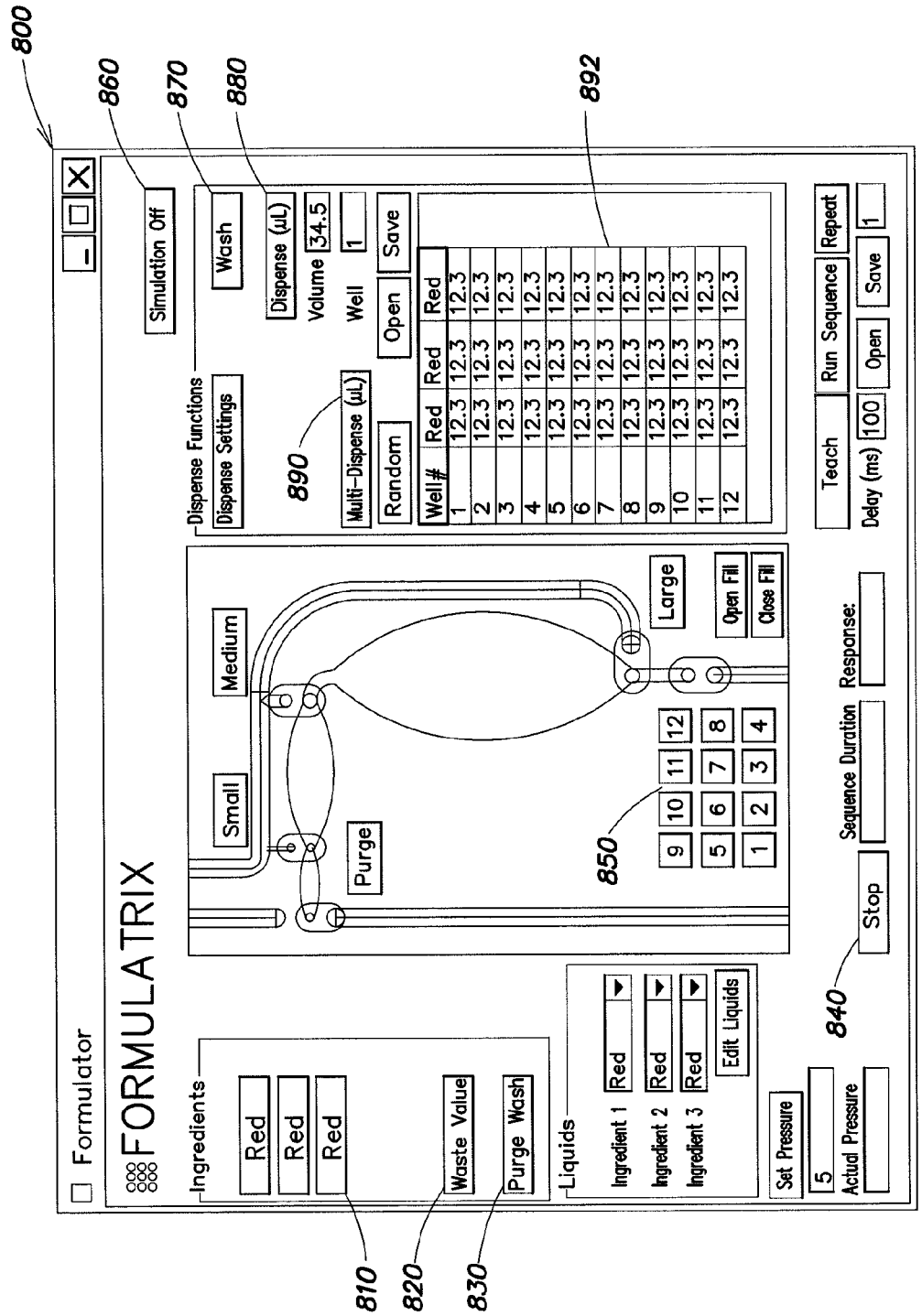
FIG. 11 is a one embodiment of a software interface employed to control a fluid handling device.

A software control system may be integrated into the fluid handling device allowing for ease of use. A main console or user interface 800, graphically depicted in FIG. 11, may be provided for efficient and intuitive control. Ingredient control 810 from the ingredient manifold 400 provides for valve and pressure management so as to selectively introduce the proper ingredient into the fluidic chip 300 at the desired moment. Waste valve control 820 allows for a waste valve at the end of the ingredient manifold 400 to direct wash materials into a waste container. Purge wash control 830 functions to allow for air or water to be selected for use as purge material whenever desired. As explained above, in one embodiment, either air or water can be used as the purge material. Stop control 840 serves to discontinue the current sequence whenever desired. Individual fill valve control 850 allows a user to manipulate which ingredients are chosen to load which particular metering chambers. Wash cycle control 870 functions to set the wash cycle in motion so that metering chambers can be filled with subsequent ingredients. A dispense sequence control 880 enables the system to run a dispense sequence for a single well. A multi-dispense control 890 allows for a full dispense of all the ingredients according to a dispense grid 892, with washing in between ingredient dispenses. The values in the dispense grid 892 can be changed so that different volumes can be dispensed into different wells. Functions also exist in the software for pre-made grids to be loaded in or saved as necessary. Means for running the software using a simulation control 860 feature allows for program use without the actual fluid handling device attached to the system. The software may be implemented in a stand-alone computer or on a multi-purpose general computer, as desired.

As apparent from the above description, fluid movement occurs by employing a drive fluid (e.g., compressed air) through the fluid filled channels. However, it should be appreciated that the present invention is not limited in this regard, as other suitable arrangements for moving the fluid may be employed. As will be described below, one such arrangement includes a diaphragm pump. And, although the diaphragm pump may be used in the arrangement described above, the diaphragm pump can be used in any other suitable device where it is necessary to move fluid. As such, the below described diaphragm pump can be employed in devices including none, some, or all of the features of the device described above.

Turning now to FIGS. 12A and 12B, one illustrative embodiment of a diaphragm pump 900 will now be described. The pump 900 may have a molded multi-level construction that includes a base 902, a flexible membrane 904, and a lip 906. Similar in construction to that of valve 700, the base 902 may provide a compression surface against a fluid thin layer 352, adding stability to the pump 900 while allowing for an airtight seal to be formed. Also similar in construction to that of valve 700, the lip 906 may extend upward from between the base 902 and the flexible membrane 904, allowing pump 900 to be anchored in place, further providing a seal around its perimeter. In addition, flexible membrane 904 may include two regions, a raised thickness portion 905 in substantially the center of the membrane, and a thinner portion 903 that substantially surrounds the thicker portion 905. When the flexible membrane 904 of the pump 900 is actuated in a direction away from the fluid layer 350, the thicker portion 905 of the flexible membrane 904 may be pushed up against a rigid upper stop constraint, for example control thin bottom layer 316, which may result in a more consistent metering volume to eventually be expelled from the pump 900.

In various embodiments, the thickness of the thicker portion 905 of flexible membrane 904 may vary. In some cases, the thickness of the thicker portion 905 may vary according to the volume that is desired for a pump to dispense. In some embodiments, there is no thicker portion, as the thickness of the flexible membrane 904 may be substantially uniform across the surface, i.e., the thicker portion 905 is the substantially the same thickness as the thinner portion 903. In other embodiments, the thickness of the thicker portion 905 may be as tall as the lip 906 that surrounds the flexible membrane 904. In this regard, if the thicker portion 905 is as tall as the lip 906, extending from the fluid layer 350 to the control layer 310, then the membrane 904 would not be able to substantially actuate without severe deformation. However, if the height of the thicker portion 905 is less than the height of the lip 906, then upon membrane actuation toward the control layer 310, a small volume of fluid could be temporarily stored between the fluid layer 350 and the membrane 904. If the height of the thicker portion 905 is slightly less than the height of the lip 906, then if the membrane is actuated toward the control layer 310, then a smaller volume could be metered out from a pump 900 than if the thicker portion 905 is significantly shorter than the height of the lip 906. In various embodiments, the thicker portion 905 may range from approximately 100 microns thick to approximately 500 microns thick. In some embodiments, the thicker portion 905 may be approximately 400 microns thick. In other embodiments, the thicker portion 905 may be approximately 220 microns thick.

The thicker portion 905 may also be shaped in any suitable form. In some embodiments, the thicker portion 905 may be substantially rectangular in shape. In other embodiments, the thicker portion 905 may be substantially trapezoidal in shape. In further embodiments, the thicker portion 905 may be substantially shaped as a parallelogram.

In another aspect, the thinner portion 903 may allow for the flexible membrane 904 to deflect upon actuation, for example, through application of a pressure or vacuum from the control layer 310. In this respect, the distance of the thinner portion 903 of the membrane 904 that exists between the lip 906 and the thicker portion 905 may be suitably determined such that excessive stresses and/or slack incurred by the thinner portion 903 may be largely avoided upon membrane actuation. In this regard, the distance of the thinner portion 903 from lip 906 to thicker portion 905 may be large enough such that the thicker portion 905 may reach the relatively rigid back stop without excessive stretch placed on the thinner portion 903. On the other hand, the distance of the thinner portion 903 from lip 906 to thicker portion 905 may also be limited enough so that the flexible membrane 904 does not awkwardly deform from excessive slack. In some embodiments, the distance of the thinner portion 903 of the flexible membrane 904 from lip 906 to thicker portion 905 is approximately the thickness of the thinner portion 903 of the membrane 904. In other embodiments, the distance of the thinner portion 903 of the flexible membrane 904 from lip 906 to thicker portion 905 is approximately the thickness of the thicker portion 905. In further embodiments, as previously described, there is no thicker portion 905 of the flexible membrane 904, resulting in a distance of the thinner portion 903 of the membrane 904 running from one side of a lip 906 to another side of a lip 906.

In other aspects, a thicker membrane portion 905 may also aid in lowering the possibility of having fluid become caught at the side edges 903 of the flexible membrane 904. In this respect, for some embodiments, the membrane 904 may be designed such that the thinner side edges 903 of the membrane 904 may deform more readily than the thicker portion 905. In different embodiments, as previously mentioned, the thicker portion 905 may be formed out of a substantially more rigid material than the more flexible regions of the membrane 904. It can be appreciated that for the pump 900 to suitably function, it is not a requirement for the flexible membrane 904 to be of varying thickness. It can also be appreciated that for a valve 700 to suitably function, a thicker membrane portion 905 may also be incorporated into the flexible membrane 904.

FIG. 12A depicts pump 900 in an empty state where a seal is formed between the membrane 904 and the fluid thin layer 352. In this respect, enough force is exerted on the membrane 904 and/or by the membrane 904 so as to prevent a fluid ingredient 500 from passing from the fluid channel 502 through a fluid access hole 954. FIG. 12B shows pump 900 in a fill state where the seal between the membrane 904 and the fluid thin layer 352 has been released and a fluid ingredient 500 is permitted to pass from fluid channel 502 through fluid access hole 954. In this respect, a pump space 910 with fluid temporarily stored within is formed as the membrane 904 is pushed up against the control thin bottom layer 316 which acts as a rigid back stop, limiting excessive membrane deflection. For the embodiment depicted, the rigid back stop creates a constraint that allows for the amount of fluid temporarily stored within pump space 910 to be well controlled. Accordingly, aspects of pump 900 may be designed to consistently meter out precise volumes of fluid according to the pump space 910 that may be filled as desired.

Pump 900 may be controlled through application of pressure, where a fluid, e.g., air, may be pushed against a flexible membrane 904 so that fluid ingredient 500 may be expelled out of the pump 900. In various embodiments, it is possible for a lack of pressure to be applied to the flexible membrane 904, allowing fluid to flow through a fluid access hole 354 immediately underneath the membrane 904. In more embodiments, a vacuum may be applied to the flexible membrane 904, allowing for fluid to more easily flow into a pump space 910. It should be appreciated that in different embodiments, the opposite control effect could occur, where the pump 900 may be designed such that application of pressure through a control port to the membrane 904 could serve to allow fluid to be received into a pump space 910, and that not applying pressure, or applying a vacuum, through a control port could serve to expel material out of the pump space 910.

In addition, similar to the described valve 700, the pump 900 may be formed out of a wide variety of suitable materials. In some embodiments, valves 700 and/or pumps 900 may be formed out of an elastomeric material such as silicone, rubber, polyurethane, polydimethylsiloxane, fluoropolymer (e.g., perfluoroelastomers such as Kalrez®), or any suitable polymeric equivalent or suitable combinations thereof. In other embodiments, the material which valves 700 and/or pumps 900 are made out of are substantially solvent resistant. In further embodiments, the valves may be made of a suitable rigid material, such as a metal or a ceramic, that can be actuated through any appropriate arrangement, whether electrical or mechanical in nature. If a rigid material is used, a hinge or gateway that can be opened or closed may be employed. In yet more embodiments, different parts of valves 700 and/or pumps 900 may be formed out of a variety of materials. As a non-limiting example, flexible membrane 904 may be formed out of one material, or alternatively, may be formed out of a plurality of materials. In this respect, a thicker portion 905 may incorporate a material that may be substantially different and/or substantially more rigid, for example, than other parts of the flexible membrane 904.

FIG. 12A depicts one embodiment of a pump 900 in an emptied state where the flexible membrane 904 forms a seal with the fluid thin layer 352, substantially preventing fluid from entering into a pump space 910 above the fluid layer 350. In some embodiments, pressure may be appropriately applied through a control channel 330 that may run through a control thick layer 314, being in communication with a control access hole 318 in a control thin bottom layer 316. When the pump 900 empties, fluid may be suitably pushed out from its pump space 910 into a fluid channel 502.

FIG. 12B depicts another embodiment of a pump 900 in a fill state where the flexible membrane 904 is brought towards the more rigid control thin bottom layer 316 and fluid enters into the pump space 910 from the fluid channel 502. In this respect, a vacuum, or lack of pressure, may be applied through a control channel 330 that may run through a control thick layer 314, in communication with a control access hole 318. When the pump 900 fills, fluid may be suitably pulled into its pump space 910.

As previously described, it is possible for flexible membrane 904 to be controlled by the application of pressure or vacuum through a control channel 330 where applying pressure may allow the membrane to close, empty its pump space 910, and/or stay closed. On the other hand, applying a vacuum may result in the flexible membrane 904 opening and filling its metering chamber 910 and/or remaining open. In some embodiments, the control access hole 318 may be positioned off center towards the edge of the membrane 904 such that when the pump 900 is in its fill or open state, the membrane 904 does not block control access hole 318. It is also possible for an off centered control access hole 318 to help ensure that the pump 900 delivers an appropriate volume of fluid by lowering the chance that the membrane 904 prematurely blocks passage of fluid to the fluid access hole 354. It should be understood that it is not required for the control access hole 318 to be positioned off center with respect to the membrane 904.

FIGS. 13A-13F depict, for one embodiment, operation of a pump 900 surrounded by a valve 901a on one side and a valve 901b on the other side. In this respect, fluid ingredient 500 is transported via fluid channel 502a from one side through valve 901a to fluid channel 502b, metered into and expelled out of pump 900 toward the other side through valve 901b toward fluid channel 502c. Control is provided through control layer 310 via positive and negative pressure control and fluid access occurs in fluid layer 350. Pump 900 and valves 901a and 901b are positioned in between control layer 310 and fluid layer 350. In this embodiment, valves 901a and 901b, and pump 900 are integrally connected and formed of the same material. It should be understood that pumps 900 and/or valves 901a and 901b are not required to be formed of the same material nor are pumps 900 and/or valves 901a and 901b required to be connected.

It should also be understood that even though control thin bottom layer 316 and fluid thin layer 352 are each depicted to be one unitary piece, none of the layers described herein are required to be a unitary piece as such. For example, pieces of layers could be positioned relative to one another, in any appropriately functioning combination. Furthermore, as described above for valve 700, for added support, spacers 322 may be suitably positioned between control layer 310 and fluid layer 350.

Figure 13A:
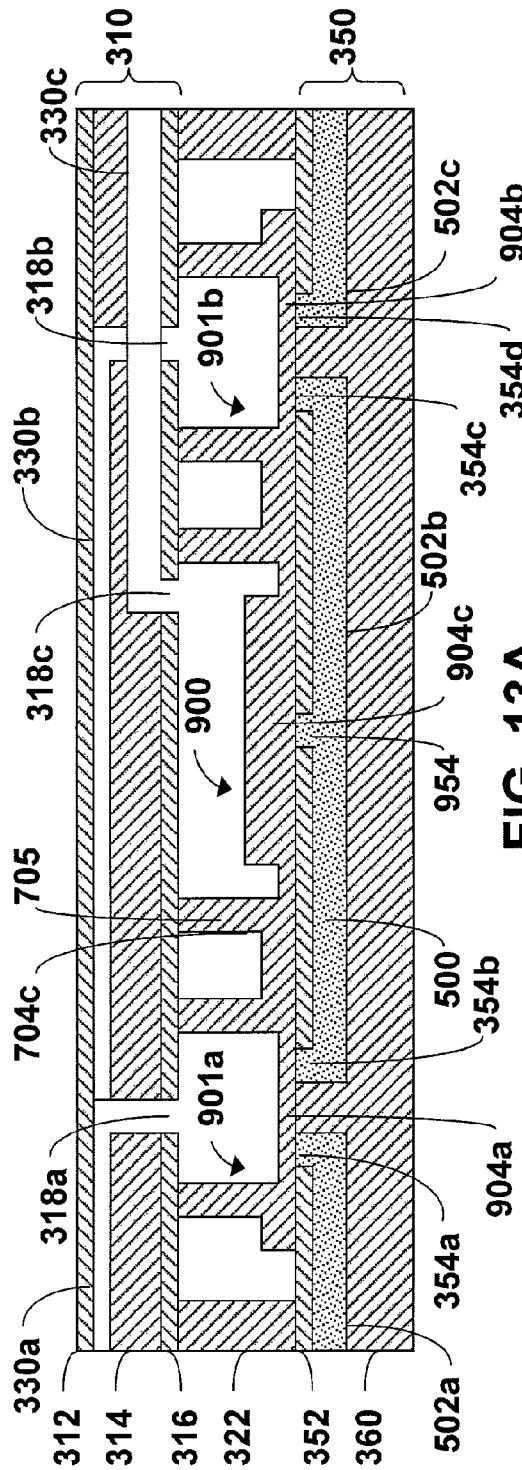

In FIG. 13A, while fluid channels 502a, 502b, and 502c are primed with fluid ingredient 500, both valves 901a and 901b along with pump 900 are closed. In this respect, pressure may be applied from control channel 330a through control access port 318a such that the flexible membrane 904a of valve 901a forms a seal with the fluid thin layer 352, preventing fluid to flow between fluid access ports 354a and 354b. Similarly for valve 901b, pressure may be applied from control channel 330b through control access port 318b such that the flexible membrane 904b forms a seal with the fluid thin layer 352, preventing fluid to flow between fluid access ports 354c and 354d. As fluid flow is impeded between valves 901a and 901b, pump 900 also remains in an emptied configuration. In this case, pressure may be applied from control channel 330c through control access port 318c such that the flexible membrane 904c forms a seal with the fluid thin layer 352, preventing fluid to flow through fluid access port 954.

Figure 13B:
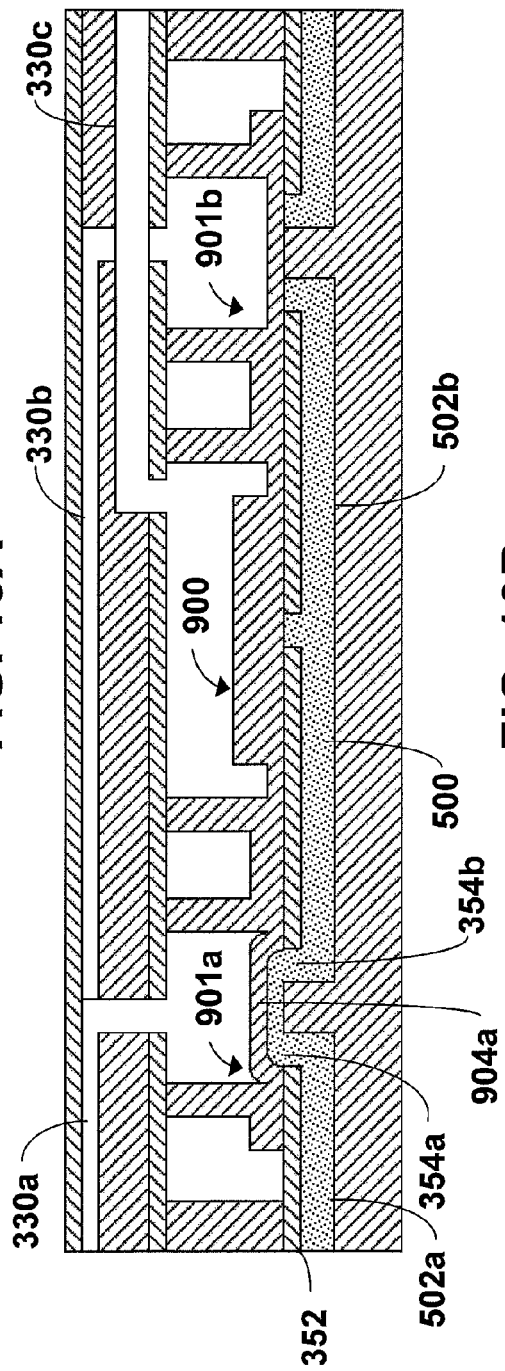

FIG. 13B shows valve 901a in an open state, allowing fluid ingredient 500 to flow from fluid channel 502a to fluid channel 502b through fluid access holes 354a and 354b. In this respect, pressure that was previously applied from control channel 330a to valve 901a is released and application of a vacuum allows for the seal between flexible membrane 904a and the fluid thin layer 352 to be released, permitting fluid to flow through valve 904a. It can be appreciated that a vacuum is not required for fluid to flow through valve 904a as in some embodiments, a simple decrease in the pressure applied through control channel 330a may at least partially release the seal between membrane 904a and fluid thin layer 352. In this case, a seal between the membranes of pump 900 and valve 901b with the fluid thin layer 352 still remains as pressure may be applied through control channels 330b and 330c.

FIG. 13C shows pump 900 entering into a fill state as fluid ingredient 500 from fluid channel 502b is pulled into the pump space 910 through fluid access hole 954 from the direction of fluid channel 502a as a vacuum is applied through control channel 330c. In this regard, the thicker portion 905 of flexible membrane 904c is substantially prevented from further deformation as the membrane 904c may, for example, come into contact with the relatively rigid control thin bottom layer 316. As a result, the volume of fluid ingredient 500 pulled into the pump space 910 may be consistent with each fill state. It can be appreciated that a vacuum is not required for fluid to flow up into the pump space of pump 900 as in some embodiments, a simple decrease in the pressure applied through control channel 330c may at least partially release the seal between membrane 904c and fluid thin layer 352. At this point, as depicted in FIG. 13C, for some embodiments, control channels 330a and 330c apply a vacuum to valve 901a and pump 900, respectively, releasing the seal between flexible membranes 904a and 904c and fluid thin layer 352. At the same time, control channel 330b applies a pressure to valve 901b, maintaining the seal between flexible membrane 904b and fluid thin layer 352.

FIG. 13D shows valve 901a in a closed state, preventing fluid flow between fluid channels 502a and 502b. In this respect, pressure is applied from control channel 330a so that a seal may be formed between flexible membrane 904a and fluid thin layer 352. On the other hand, valve 901b is depicted in an open state where a vacuum is now applied from control channel 330b so that the seal between flexible membrane 904b and fluid thin layer 352 may be released, allowing fluid to flow between fluid channels 502b and 502c through fluid access holes 354c and 354d. Pump 900 remains in a fill state, with vacuum application remaining via control channel 330c. Similar to that described above, it can be appreciated that a vacuum is not required for fluid to flow through valve 901b as in some embodiments, a simple decrease in the pressure applied through control channel 330b may at least partially release the seal between membrane 904b and fluid thin layer 352.

FIG. 13E depicts valve 901a remaining in a closed state, with positive pressure continuing to be applied from control channel 330a, maintaining the seal between flexible membrane 904a and fluid thin layer 352, and resulting in prevention of fluid flow between fluid channels 502a and 502b. Valve 901b also remains in an open state with a vacuum continued to be applied from control channel 330b for the seal between flexible membrane 904b and fluid thin layer 352 to remain released, allowing fluid flow to occur between fluid channels 502b and 502c. However, pump 900 actuates to an empty state from pressure applied through control channel 330c. where fluid that had previously been in the pump space 910 is pushed out through fluid access hole 954 to fluid channel 502b and in a direction toward valve 901b. At this point, because valve 901b is open, allowing fluid to flow through to occur, fluid ingredient 500 is able to be transported from fluid channel 502b to fluid channel 502c through fluid access holes 354c and 354d through force applied from the membrane 904c of pump 900.

FIG. 13F depicts valves 901a and 901b both in a closed state with pressure applied from control channels 330a and 330b, respectively, on to the flexible membranes 904a and 904b. Pump 900 is also shown in an empty state where pressure is applied from control channel 330c on to flexible membrane 904c. It should be understood that as fluid flow depicted in FIGS. 13A-13F occurs from fluid channel 502a to fluid channel 502c, in this embodiment, depending on how valves 901a and 901b, and pump 900 are operated, fluid flow could also be controlled from fluid channel 502c to fluid channel 502a and back again.

It can be appreciated that various arrangements and combinations of valves and pumps as discussed above may be constructed in a dispensing device for precise control of fluid flow direction and volume to occur as desired. In this respect, valves on either side of a pump 900 may control when fluid is to be dispensed and the pump 900 may serve to meter and push out a suitable amount of fluid through the fluid channels and out of the device when valves and other parts of the device are appropriately actuated. In this regard, when incorporated into different aspects of the overall microfluidic dispensing device, depending on how pumps are constructed, dispense volumes may range widely from approximately 10 nanoliters to approximately 100 microliters. In some embodiments, dispense volumes may be approximately 100 nanoliters. In other embodiments, dispense volumes may be approximately 3 microliters.

In one embodiment, the valve structure 700 that has been described above may also be used as a diaphragm pump in facilitating transport of fluid back and forth through fluid access port holes. More specifically, with such a pump, upon membrane actuation, fluid may travel back through the same port from which the fluid entered in. It should be understood that the valve structure described previously may be referred to as a pump, as the manufacture of the structures may be substantially similar, yet slight differences may exist in operation between an article with a flexible membrane that is used as a valve and/or used as a pump, for example, the number of fluid access ports that contact the structure from the fluid layer 350 may vary. In some embodiments, one port hole may serve as both an inlet and outlet for a pump. In other embodiments, a plurality of ports, serving as inlets and/or outlets may be employed. Indeed, when manufactured, a valve 700 may functionally be used as a pump, and conversely, a pump may be used as a valve.

In addition, pumps may also serve as metering chambers themselves, where fluid that is to be dispensed from a microfluidic assembly at a precise amount may be temporarily stored within a pump space. In this regard, valves and pumps may be used in whatever suitable fashion to control efficient and accurate dispensing of a multiple of fluid ingredients as desired.

The foregoing written specification is to be considered to be sufficient to enable one skilled in the art to practice the invention. While the best mode for carrying out the invention has been described in detail, those skilled in the art to which this invention relates will recognize various alternative embodiments including those mentioned above as defined by the following claims. The examples disclosed herein are not to be construed as limiting of the invention as they are intended merely as illustrative of particular embodiments of the invention as enabled herein. Therefore, systems and methods that are functionally equivalent to those described herein are within the spirit and scope of the claims appended hereto. Indeed, various modifications of the invention in addition to those shown and described herein will become apparent to those skilled in the art from the foregoing description and fall within the scope of the appended claims.

What is claimed is:

1. A microfluidic valve comprising:
a multi-level unitary elastomeric valve member comprising:
   a flexible membrane portion having a first membrane thickness;
   a base membrane portion integrally formed with the flexible membrane portion, the base membrane portion surrounding the flexible membrane portion, the base membrane portion having a base thickness, the base thickness being greater than the first membrane thickness, wherein the base membrane portion and the flexible membrane portion form a single monolithic member; and
   a lip portion disposed between the base membrane portion and the flexible membrane portion, the lip portion having a height that is greater than the base thickness; and
a substrate comprising a plurality of fluid access ports in fluid communication with the flexible membrane portion and the flexible membrane portion being adapted to deflect away from the fluid access ports so as to allow fluid to pass between a first fluid access port and a second fluid access port upon membrane actuation.

2. The microfluidic valve of claim 1, further comprising a pressure port in fluid communication with the flexible membrane portion, wherein the flexible membrane portion is adapted to form a seal with the fluid access ports upon application of closing pressure.

3. The microfluidic valve of claim 2, wherein the flexible membrane portion is adapted to move upon reduction of pressure at the pressure port.

4. The microfluidic valve of claim 2, wherein the flexible membrane portion is adapted to allow fluid to flow between a first fluid access port and a second fluid access port upon reduction of pressure at the pressure port.

5. The microfluidic valve of claim 1, further comprising an upper layer disposed adjacent to the flexible membrane portion, the upper layer being relatively more rigid than the flexible membrane portion and wherein the substrate is disposed adjacent to the flexible membrane portion, the substrate being relatively more rigid than the flexible membrane portion.

6. A microfluidic valve comprising:
multi-level unitary elastomeric valve member comprising:
   a flexible membrane portion having a first membrane thickness; and
   a base membrane portion integrally formed with the flexible membrane portion, the base membrane portion surrounding the flexible membrane portion, the base membrane portion having a base thickness, the base thickness being greater than the first membrane thickness, wherein the base membrane portion and the flexible membrane portion form a single monolithic member; and
   a lip portion molded with the flexible membrane portion and the base membrane portion, the lip portion disposed between the base membrane portion and the flexible membrane portion, the lip portion having a height that is greater than the base thickness.

7. The microfluidic valve of claim 6, further comprising a substrate comprising a plurality of fluid access ports in fluid communication with the flexible membrane portion and the flexible membrane portion being adapted to deflect away from the fluid access ports so as to allow fluid to flow between a first fluid access port and a second fluid access port upon membrane actuation.

8. The microfluidic valve of claim 7, further comprising a pressure port in fluid communication with the flexible membrane portion, wherein the flexible membrane portion is adapted to form a seal with the fluid access ports upon application of closing pressure.

9. The microfluidic valve of claim 8, wherein the flexible membrane portion is adapted to move upon reduction of pressure at the pressure port.

10. The microfluidic valve of claim 8, wherein the flexible membrane portion is adapted to allow fluid to flow between a first fluid access port and a second fluid access port upon reduction of pressure at the pressure port.

11. The microfluidic valve of claim 6, further comprising an upper layer disposed adjacent to the flexible membrane portion, the upper layer being relatively more rigid than the flexible membrane portion and a lower layer disposed adjacent to the flexible membrane portion, the lower layer being relatively more rigid than the flexible membrane portion.

12. The microfluidic valve of claim 6, further comprising a first fluid access port in fluid communication with a first fluid channel and the flexible membrane portion and a second fluid access port in fluid communication with a second fluid channel and the flexible membrane portion, the second fluid channel being separate from the first fluid channel, wherein the flexible membrane portion is adapted to deflect away from the first and second fluid access ports to allow fluid to pass between the first and second fluid access ports.

13. The microfluidic valve of claim 12, wherein the first and second fluid access ports are disposed in the same horizontal plane.

14. The microfluidic valve of claim 6, wherein the multi-level unitary elastomeric valve member comprises a flat surface that extends continuously from a first portion of the elastomeric valve member to a second portion of the elastomeric valve member, the first and second portions disposed on opposite sides of the elastomeric valve member.

15. The microfluidic valve of claim 6, wherein the multi-level unitary elastomeric valve member is free of openings.

16. The microfluidic valve of claim 6, wherein the flexible membrane portion comprises a thicker portion having a thicker flexible membrane thickness and a thinner portion having a thinner flexible membrane thickness, the thicker flexible membrane thickness being greater than the thinner flexible membrane thickness.

17. The microfluidic valve of claim 16, wherein the base membrane thickness is greater than the thicker flexible membrane thickness.

18. The microfluidic valve of claim 16, wherein the base membrane thickness is less than the thicker flexible membrane thickness.

19. The microfluidic valve of claim 16, wherein the flexible membrane thickness is the same as the thinner flexible membrane thickness.

20. A microfluidic valve assembly comprising:
multi-level unitary elastomeric valve member comprising:
　a flexible membrane portion having a first membrane thickness;
　a base membrane portion integrally formed with the flexible membrane portion, the base membrane portion surrounding the flexible membrane portion, the base membrane portion having a base thickness, the base thickness being greater than the first membrane thickness, wherein the base membrane portion and the flexible membrane portion form a single monolithic member; and
　a lip portion disposed between the base membrane portion and the flexible membrane portion, the lip portion having a height that is greater than the base thickness;
an upper layer disposed adjacent to the flexible membrane portion, the upper layer being relatively more rigid than the flexible membrane portion; and
a lower layer disposed adjacent to the flexible membrane portion, the lower layer being relatively more rigid than the flexible membrane portion.

21. The microfluidic valve assembly of claim 20, wherein the upper layer contacts the lip portion.

22. The microfluidic valve assembly of claim 20, wherein the lower layer comprises a plurality of fluid access ports in fluid communication with the flexible membrane portion, the flexible membrane portion being adapted to deflect away from the fluid access ports so as to allow fluid to flow between a first fluid access port and a second fluid access port upon membrane actuation.

23. The microfluidic valve assembly of claim 22, wherein the upper layer comprises a pressure port in fluid communication with the flexible membrane portion, the flexible membrane portion being adapted to form a seal with the fluid access ports upon application of closing pressure.

* * * * *